United States Patent
Jang

(10) Patent No.: US 10,629,899 B1
(45) Date of Patent: Apr. 21, 2020

(54) PRODUCTION METHOD FOR ELECTROCHEMICALLY STABLE ANODE PARTICULATES FOR LITHIUM SECONDARY BATTERIES

(71) Applicant: Nanotek Instruments, Inc., Dayton, OH (US)

(72) Inventor: Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 0 days.

(21) Appl. No.: 16/160,283

(22) Filed: Oct. 15, 2018

(51) Int. Cl.
*H01M 10/44* (2006.01)
*H01M 4/36* (2006.01)
(Continued)

(52) U.S. Cl.
CPC ........... *H01M 4/366* (2013.01); *H01M 4/587* (2013.01); *H01M 10/058* (2013.01); *H01M 10/0525* (2013.01); *H01M 4/386* (2013.01); *H01M 4/387* (2013.01); *H01M 4/483* (2013.01); *H01M 4/523* (2013.01); *H01M 2004/027* (2013.01)

(58) Field of Classification Search
CPC ...... H01M 4/366; H01M 4/587; H01M 4/386; H01M 4/387; H01M 4/483; H01M 4/523; H01M 10/0525; H01M 10/058; H01M 10/052; H01M 2004/027
See application file for complete search history.

(56) References Cited

U.S. PATENT DOCUMENTS 2,798,878 A   7/1957  Hummers
3,836,511 A   9/1974  O'farrell et al.
(Continued)

FOREIGN PATENT DOCUMENTS

CN   103258990 A   8/2013
CN   105322132 A   2/2016
(Continued)

OTHER PUBLICATIONS

Karlicky et al., "Halogenated Graphenes: Rapidly Growing Family of Graphene Derivatives" ACS Nano (2013) vol. 7, No. 8, pp. 6434-6464.
(Continued)

*Primary Examiner* — Raymond Alejandro

(57) ABSTRACT

Provided is a method of producing multiple anode particulates, comprising: a) dispersing an electrically conducting material, primary particles of an anode active material, an optional electron-conducting material, and a sacrificial material in a liquid medium to form a precursor mixture; b) forming the precursor mixture into droplets and drying the droplets; and c) removing the sacrificial material or thermally converting the sacrificial material into a carbon material to obtain multiple particulates, wherein a particulate comprises one or a plurality of anode active material particles having a volume Va, an electron-conducting material, and pores having a volume Vp which are encapsulated by a thin encapsulating layer having a thickness from 1 nm to 10 μm and a lithium ion conductivity from $10^{-8}$ S/cm to $5 \times 10^{-2}$ S/cm and the volume ratio Vp/Va in the particulate is from 0.3/1.0 to 5.0/1.0.

18 Claims, 9 Drawing Sheets

(51) Int. Cl.
   *H01M 10/0525* (2010.01)
   *H01M 10/058* (2010.01)
   *H01M 4/587* (2010.01)
   *H01M 4/38* (2006.01)
   *H01M 4/52* (2010.01)
   *H01M 4/48* (2010.01)
   *H01M 4/02* (2006.01)

(56) References Cited

U.S. PATENT DOCUMENTS

| | | | |
|---|---|---|---|
| 4,720,910 A | 1/1988 | Rourke et al. | |
| 5,057,339 A | 10/1991 | Ogawa | |
| 5,270,417 A | 12/1993 | Soga et al. | |
| 5,350,647 A | 9/1994 | Hope et al. | |
| 5,424,151 A | 6/1995 | Koksbang et al. | |
| 5,434,021 A | 7/1995 | Fauteux et al. | |
| 5,536,599 A | 7/1996 | Alamgir et al. | |
| 5,648,187 A | 7/1997 | Skotheim | |
| 5,961,672 A | 10/1999 | Skotheim et al. | |
| 6,025,094 A | 2/2000 | Visco et al. | |
| 6,447,952 B1 | 9/2002 | Spiegel et al. | |
| 6,451,484 B1 | 9/2002 | Han et al. | |
| 6,475,678 B1 | 11/2002 | Suzuki | |
| 6,515,101 B1 | 2/2003 | Sheares | |
| 6,620,547 B1 | 9/2003 | Sung et al. | |
| 6,733,924 B1 | 5/2004 | Skotheim et al. | |
| 6,797,428 B1 | 9/2004 | Skotheim et al. | |
| 6,936,381 B2 | 8/2005 | Skotheim et al. | |
| 7,247,408 B2 | 7/2007 | Skotheim et al. | |
| 7,282,295 B2 | 10/2007 | Visco et al. | |
| 7,282,296 B2 | 10/2007 | Visco et al. | |
| 7,282,302 B2 | 10/2007 | Visco et al. | |
| 7,618,678 B2 | 11/2009 | Mao et al. | |
| 8,597,828 B2 | 12/2013 | Martinet et al. | |
| 9,905,856 B1 | 2/2018 | Zhamu et al. | |
| 10,084,182 B2 | 9/2018 | Pan et al. | |
| 2002/0182488 A1 | 12/2002 | Cho et al. | |
| 2002/0195591 A1 | 12/2002 | Ravet et al. | |
| 2003/0180619 A1 | 9/2003 | Tamura et al. | |
| 2004/0018430 A1 | 1/2004 | Holman et al. | |
| 2005/0034993 A1 | 2/2005 | Gozdz et al. | |
| 2005/0098914 A1 | 5/2005 | Varma et al. | |
| 2005/0118508 A1 | 6/2005 | Yong et al. | |
| 2005/0136330 A1 | 6/2005 | Mao et al. | |
| 2007/0218369 A1 | 9/2007 | Kaiduka et al. | |
| 2007/0289879 A1 | 12/2007 | Horton | |
| 2008/0248393 A1 | 10/2008 | Richard et al. | |
| 2008/0318128 A1 | 12/2008 | Simoneau et al. | |
| 2009/0155676 A1 | 6/2009 | Zhamu et al. | |
| 2009/0169725 A1 | 7/2009 | Zhamu et al. | |
| 2010/0099029 A1 | 4/2010 | Kinoshita et al. | |
| 2010/0112454 A1 | 5/2010 | Visco et al. | |
| 2010/0143798 A1 | 6/2010 | Zhamu et al. | |
| 2010/0173198 A1 | 7/2010 | Zhamu et al. | |
| 2011/0059361 A1 | 3/2011 | Wilkening et al. | |
| 2011/0104571 A1 | 5/2011 | Zhamu et al. | |
| 2011/0143211 A1 | 6/2011 | Takeyama | |
| 2011/0177388 A1 | 7/2011 | Bae et al. | |
| 2011/0244337 A1 | 10/2011 | Ohta et al. | |
| 2011/0262816 A1 | 10/2011 | Amatucci | |
| 2012/0064409 A1 | 3/2012 | Zhamu et al. | |
| 2012/0070708 A1 | 3/2012 | Ohira et al. | |
| 2012/0088154 A1 | 4/2012 | Liu et al. | |
| 2013/0054061 A1 | 2/2013 | Nishimoto | |
| 2013/0157141 A1 | 6/2013 | Zhong et al. | |
| 2013/0164615 A1 | 6/2013 | Manthiram et al. | |
| 2013/0171339 A1 | 7/2013 | Wang et al. | |
| 2013/0224603 A1 | 8/2013 | Chen et al. | |
| 2013/0292613 A1 | 11/2013 | Wegner et al. | |
| 2014/0072879 A1 | 3/2014 | Chen et al. | |
| 2014/0147738 A1 | 5/2014 | Chen et al. | |
| 2014/0147751 A1 | 5/2014 | Yang et al. | |
| 2014/0154572 A1 | 6/2014 | Singh et al. | |
| 2014/0178747 A1 | 6/2014 | Tsai et al. | |
| 2014/0234702 A1 | 8/2014 | Zhang et al. | |
| 2014/0235513 A1 | 8/2014 | Kverel et al. | |
| 2014/0363746 A1 | 12/2014 | He et al. | |
| 2015/0044556 A1 | 2/2015 | Wang et al. | |
| 2015/0044565 A1* | 2/2015 | Wang | H01M 4/366 429/221 |
| 2015/0064568 A1 | 3/2015 | Yushin et al. | |
| 2015/0064574 A1 | 3/2015 | He et al. | |
| 2015/0180000 A1 | 6/2015 | Roumi | |
| 2015/0180037 A1 | 6/2015 | Gronwald et al. | |
| 2015/0221935 A1 | 8/2015 | Zhou et al. | |
| 2015/0244025 A1 | 8/2015 | Rhee et al. | |
| 2015/0318532 A1 | 11/2015 | Manthiram et al. | |
| 2015/0325844 A1 | 11/2015 | Inoue | |
| 2016/0013481 A1 | 1/2016 | Jeong et al. | |
| 2016/0043384 A1 | 2/2016 | Zhamu et al. | |
| 2016/0087266 A1 | 3/2016 | Muldoon et al. | |
| 2016/0126543 A1 | 5/2016 | Ota et al. | |
| 2016/0149216 A1 | 5/2016 | Mizuno et al. | |
| 2016/0181611 A1 | 6/2016 | Cho et al. | |
| 2016/0204431 A1* | 7/2016 | Sawa | H01M 4/134 429/218.1 |
| 2016/0218341 A1 | 7/2016 | Kumar et al. | |
| 2016/0301075 A1 | 10/2016 | Zhamu et al. | |
| 2016/0344035 A1 | 11/2016 | Zhamu et al. | |
| 2016/0351877 A1 | 12/2016 | Kusachi et al. | |
| 2016/0351909 A1 | 12/2016 | Bittner et al. | |
| 2016/0372743 A1 | 12/2016 | Cho et al. | |
| 2016/0372784 A1 | 12/2016 | Hayner et al. | |
| 2017/0018799 A1 | 1/2017 | Jeong | |
| 2017/0047584 A1 | 2/2017 | Hwang et al. | |
| 2017/0062830 A1 | 3/2017 | Bao et al. | |
| 2017/0092986 A1 | 3/2017 | Ogawa et al. | |
| 2017/0098824 A1 | 4/2017 | Fasching et al. | |
| 2017/0098856 A1 | 4/2017 | Zhamu et al. | |
| 2017/0104204 A1 | 4/2017 | Zhamu et al. | |
| 2017/0117535 A1 | 4/2017 | Yoon et al. | |
| 2017/0117538 A1 | 4/2017 | Bendimerad et al. | |
| 2017/0117589 A1 | 4/2017 | Tajima et al. | |
| 2017/0141387 A1 | 5/2017 | Hayner et al. | |
| 2017/0141399 A1 | 5/2017 | Lux et al. | |
| 2017/0166722 A1 | 6/2017 | Zhamu et al. | |
| 2017/0179468 A1 | 6/2017 | Fanous et al. | |
| 2017/0194640 A1 | 7/2017 | Bucur et al. | |
| 2017/0194648 A1 | 7/2017 | Bucur et al. | |
| 2017/0207484 A1 | 7/2017 | Zhamu et al. | |
| 2017/0288211 A1 | 10/2017 | Zhamu et al. | |
| 2017/0309917 A1 | 10/2017 | Lee et al. | |
| 2017/0338472 A1 | 11/2017 | Zhamu et al. | |
| 2017/0338474 A1 | 11/2017 | Lee et al. | |
| 2017/0338490 A1 | 11/2017 | Xiao et al. | |
| 2018/0083265 A1 | 3/2018 | Singh et al. | |
| 2018/0190975 A1* | 7/2018 | Ishii | C01B 33/02 |
| 2018/0233736 A1 | 8/2018 | Zhamu et al. | |
| 2018/0241031 A1 | 8/2018 | Pan et al. | |
| 2018/0241032 A1 | 8/2018 | Pan et al. | |
| 2018/0248173 A1 | 8/2018 | Pan et al. | |
| 2018/0277913 A1 | 9/2018 | Pan et al. | |
| 2018/0287142 A1 | 10/2018 | Zhamu et al. | |
| 2018/0294475 A1 | 10/2018 | Zhamu et al. | |
| 2018/0294476 A1 | 10/2018 | Zhamu et al. | |
| 2018/0301707 A1 | 10/2018 | Pan et al. | |
| 2019/0058185 A1 | 2/2019 | Lee et al. | |
| 2019/0077669 A1 | 3/2019 | Zhamu et al. | |
| 2019/0081325 A1* | 3/2019 | Takeda | C01B 32/21 |
| 2019/0088958 A1 | 3/2019 | Viner et al. | |
| 2019/0260028 A1 | 8/2019 | Zhamu et al. | |

FOREIGN PATENT DOCUMENTS

| | | |
|---|---|---|
| JP | 1275613 A | 11/1989 |
| JP | 2010160984 A | 7/2010 |
| JP | 2015176656 A | 10/2015 |
| KR | 1020030050475 A | 6/2003 |
| KR | 20160052351 A | 5/2016 |
| KR | 102016008751 A | 7/2016 |
| KR | 1020170126404 A | 11/2017 |
| WO | 2007108424 A1 | 9/2007 |
| WO | 2015141799 A1 | 9/2015 |
| WO | 2016015915 A1 | 2/2016 |

(56) References Cited

FOREIGN PATENT DOCUMENTS

| | | | |
|---|---|---|---|
| WO | 2017172104 A1 | 10/2017 | |
| WO | 2017200798 A1 | 11/2017 | |
| WO | 2018148090 A1 | 8/2018 | |

OTHER PUBLICATIONS

Liu et al., "Solutions for the problems of silicon-carbon anode materials for lithium-ion batteries" Royal Society Open Science (2018) vol. 5, p. 172370.
U.S. Appl. No. 15/442,278 Final Office Action dated Oct. 21, 2019, 16 pages.
U.S. Appl. No. 15/442,803 Nonfinal Office Action dated Dec. 28, 2018, 24 pages.
U.S. Appl. No. 15/442,803 Nonfinal Office Action dated Jul. 25, 2019, 37 pages.
U.S. Appl. No. 15/442,807 Nonfinal Office Action dated Dec. 14, 2018, 7 pages.
U.S. Appl. No. 15/478,125 Final Office Action dated Aug. 23, 2019, 14 pages.
U.S. Appl. No. 15/483,342 Final Office Action dated Mar. 22, 2019, 52 pages.
U.S. Appl. No. 15/483,342 Nonfinal Office Action dated Nov. 2, 2018, 37 pages.
U.S. Appl. No. 15/483,347 Final Office Action dated Apr. 16, 2019, 23 pages.
U.S. Appl. No. 15/483,347 Nonfinal Office Action dated Nov. 2, 2018, 20 pages.
U.S. Appl. No. 15/483,347 Nonfinal Office Action dated Sep. 17, 2019, 20 pages.
U.S. Appl. No. 15/483,348 Advisory Action dated Jul. 18, 2019, 9 pages.
U.S. Appl. No. 15/483,348 Final Office Action dated Apr. 9, 2019, 28 pages.
U.S. Appl. No. 15/483,348 Nonfinal Office Action dated Nov. 21, 2018, 22 pages.
U.S. Appl. No. 15/483,348 Nonfinal Office Action dated Sep. 16, 2019, 22 pages.
U.S. Appl. No. 15/901,367 Nonfinal Office Action dated Jun. 10, 2019, 12 pages.
U.S. Appl. No. 15/910,465 Nonfinal Office Action dated Nov. 1, 2019, 12 pages.
U.S. Appl. No. 15/910,471 Non-final Office Action dated Nov. 8, 2019, 12 pages.
U.S. Appl. No. 16/014,623 Nonfinal Office Action dated Oct. 4, 2019, 8 pages.
U.S. Appl. No. 16/113,676 Nonfinal Office Action dated Oct. 4, 2019, 9 pages.
U.S. Appl. No. 16/120,875 Nonfinal Office Action dated Oct. 4, 2019, 10 pages.
U.S. Appl. No. 16/123,218 Nonfinal Office Action dated Oct. 4, 2019, 9 pages.
U.S. Appl. No. 16/166,574 Nonfinal Office Action dated Oct. 4, 2019, 9 pages.
Vaikhanski et al., "Fiber-reinforced composite foam from expandable PVC microspheres" Composites Part A (2003) vol. 34, pp. 1245-1253.
Wikipedia contributors. "Anode." Wikipedia, The Free Encyclopedia, Mar. 4, 2019, Web. Mar. 18, 2019. (Year: 2019).
Wikipedia contributors. "Molar mass distribution." Wikipedia, The Free Encyclopedia, Feb. 1, 2019, Web. Mar. 18, 2019. (Year: 2019).
Xie et al., "A Novel Method for Synthesis of Sulfonated SBS Ionomers by Ring-Opening Reaction of Epoxidized SBS, Their Characterization, Properties, and Blends" Journal of Elastomers and Plastics (2007) vol. 39, pp. 317-334.
Zeng et al., "Solvothermal synthesis of trigonal selenium with butterfly-like microstructure" Particuology (2013) vol. 11, No. 5, pp. 614-617.
Zeng et al., "Synthesis of selenium nanoparticles in the presence of polysaccharides" Materials Letters (2004) vol. 58, No. 21, pp. 2590-2594.
An et al., "Diameter-Selected Synthesis of Single Crystalline Trigonal Selenium Nanowires" Materials Chemistry and Physics (2007) vol. 101, No. 2-3, pp. 357-361.
An et al., "Large-Scale Synthesis of High Quality Trigonal Selenium Nanowires" European Journal of Inorganic chemistry (2003) vol. 17, pp. 3250-3255.
Arai et al., "Versatile supramolecular cross-linker: a rotaxane cross-linker that directly endows vinyl polymers with movable cross-links" Chemistry (2013) vol. 19, pp. 5917-5923.
Buonerba et al., "Novel Synthetic Strategy for the Sulfonation of Polybutadiene and Styrene-Butadiene Copolymers" Macromolecules (2013) vol. 46, pp. 778-784.
Chen et al., "Selenium nanowires and nanotubes synthesized via a facile template-free solution method" Materials Research Bulletin (2010) vol. 45, pp. 699-704.
Choi et al., "Highly elastic binders integrating polyrotaxanes for silicon microparticle anodes in lithium ion batteries" Science (2017) vol. 357, No. 6348, pp. 279-283.
Dwivedi et al., "An Organic Acid-induced Synthesis and Characterization of Selenium Nanoparticles" Journal of Nanotechnology (2011) Article ID 651971, 6 pages.
Elabd et al., "Sulfonation and Characterization of Poly(styrene-isobutylene-styrene) Triblock Copolymers at High Ion-Exchange Capacities" Polymer (2004) vol. 45, pp. 3037-3043.
Fan et al., "Hollow selenium encapsulated into 3D graphene hydrogels for lithium-selenium batteries with high rate performance and cycling stability" RSC Adv. (2017) vol. 7, pp. 21281-21286.
Gao et al., "Hollow Sphere Selenium Nanoparticles: Their In-Vitro Anti Hydroxyl Radical Effect" Advanced Materials (2002), vol. 14, No. 4, pp. 290-293.
Habib et al., "Elastomeric Nanocomposite Based on Exfoliated Graphene Oxide and Its Characteristics without Vulcanization" Hindawi Journal of Nanomaterials (2017) vol. 2017, Article ID 8543137, 11 pages.
Ji et al., "A highly ordered nanostructured carbon—sulphur cathode for lithium—sulphur batteries" Nature Materials (2009) vol. 8, pp. 500-506.
KR-10-015-0044333 English language translation.
Li et al., "Mixed Surfactant Template Method for Preparation of Nanometer Selenium" E-Journal of Chemistry (2009) vol. 6, No. S1, pp. S304-S310.
Lin et al., "Observation in the Growth of Selenium Nanoparticles" Journal of Chinese Chemical Society (2004) vol. 51, No. 2, pp. 239-242.
Luesakul et al., "Shape-controlled synthesis of cubic-like selenium nanoparticles via the self-assembly method" carbohydrate Polymers (2016) vol. 153, pp. 435-444.
PCT/US17/18452 International Search Report and Written Opinion dated Apr. 25, 2017, 9 pages.
PCT/US18/16404 International Search Report and Written Opinion dated Apr. 13, 2018, 11 pages.
PCT/US18/16410 International Search Report and Written Opinion dated Apr. 20, 2018, 10 pages.
PCT/US18/16418 International Search Report and Written Opinion dated Apr. 25, 2018, 9 pages.
PCT/US18/16423 International Search Report and Written Opinion dated Apr. 24, 2018, 9 pages.
PCT/US18/16426 International Search Report and Written Opinion dated Apr. 24, 2018, 9 pages.
PCT/US18/16431 International Search Report and Written Opinion dated Apr. 26, 2018, 6 pages.
PCT/US18/20892 International Search Report and Written Opinion dated May 2, 2018, 6 pages.
PCT/US18/25135 International Search Report and Written Opinion dated Jun. 27, 2018, 14 pages.
PCT/US18/25150 International Search Report and Written Opinion dated Jun. 29, 2018, 14 pages.
PCT/US18/25160 International Search Report and Written Opinion dated Nov. 21, 2018, 12 pages.

(56) References Cited

OTHER PUBLICATIONS

PCT/US18/25163 International Search Report and Written Opinion dated Jul. 27, 2018, 19 pages.
PCT/US18/43421 International Search Report and Written Opinion dated Oct. 11, 2018, 13 pages.
PCT/US18/43435 International Search Report and Written Opinion dated Jan. 7, 2019, 14 pages.
PCT/US19/18931 International Search Report and Written Opinion dated May 8, 2019, 13 pages.
PCT/US19/19061 International Search Report and Written Opinion dated May 13, 2019, 11 pages.
PCT/US19/19062 International Search Report and Written Opinion dated May 13, 2019, 9 pages.
PCT/US19/20214 International Search Report and Written Opinion dated May 2, 2019, 7 pages.
PCT/US19/20222 International Search Report and Written Opinion dated May 3, 2019, 7 pages.
PCT/US19/21137 International Search Report and Written Opinion dated Jun. 18, 2019, 13 pages.
PCT/US19/27147 International Search Report and Written Opinion dated Aug. 1, 2019, 16 pages.
PCT/US19/36748 International Search Report and Written Opinion dated Oct. 16, 2019, 11 pages.
PCT/US19/37690 International Search Report and Written Opinion dated Oct. 18, 2019, 18 pages.
PCT/US19/37692 International Search Report and Written Opinion dated Oct. 21, 2019, 18 pages.
PCT/US19/37700 International Search Report and Written Opinion dated Oct. 23, 2019, 17 pages.
PCT/US19/38367 International Search Report and Written Opinion dated Oct. 18, 2019, 17 pages.
PCT/US19/38368 International Search Report and Written Opinion dated Oct. 18, 2019, 18 pages.
PCT/US19/38436 International Search Report and Written Opinion dated Oct. 16, 2019, 17 pages.
PCT/US19/38455 International Search Report and Written Opinion dated Oct. 18, 2019, 10 pages.
PCT/US19/38456 International Search Report and Written Opinion dated Oct. 16, 2019, 16 pages.
PCT/US19/38881 International Search Report and Written Opinion dated Oct. 18, 2019, 14 pages.
PCT/US19/47642 International Search Report and Written Opinion dated Dec. 6, 2019, 16 pages.
U.S. Appl. No. 14/999,080 Nonfinal Office Action dated Nov. 9, 2018.
U.S. Appl. No. 14/999,080 Nonfinal Office Action dated Oct. 30, 2019, 15 pages.

* cited by examiner

___ 1 μm

PRODUCTION METHOD FOR ELECTROCHEMICALLY STABLE ANODE PARTICULATES FOR LITHIUM SECONDARY BATTERIES

The present invention relates generally to the field of rechargeable lithium battery and, more particularly, to the anode active materials in the form of particulates secondary particles containing a core of anode active material primary particles and pores encapsulated by a thin shell (a thin encapsulating layer) containing a carbonaceous or graphitic material and a method of producing same.

BACKGROUND OF THE INVENTION

A unit cell or building block of a lithium-ion battery is typically composed of an anode current collector, an anode or negative electrode layer (containing an anode active material responsible for storing lithium therein, a conductive additive, and a resin binder), an electrolyte and porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The binder in the binder layer is used to bond the anode active material (e.g. graphite or Si particles) and a conductive filler (e.g. carbon black or carbon nanotube) together to form an anode layer of structural integrity, and to bond the anode layer to a separate anode current collector, which acts to collect electrons from the anode active material when the battery is discharged. In other words, in the negative electrode (anode) side of the battery, there are typically four different materials involved: an anode active material, a conductive additive, a resin binder (e.g. polyvinylidine fluoride, PVDF, or styrene-butadiene rubber, SBR), and an anode current collector (typically a sheet of Cu foil). Typically the former three materials form a separate, discrete anode layer and the latter one forms another discrete layer.

The most commonly used anode active materials for lithium-ion batteries are natural graphite and synthetic graphite (or artificial graphite) that can be intercalated with lithium and the resulting graphite intercalation compound (GIC) may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g.

Graphite or carbon anodes can have a long cycle life due to the presence of a protective solid-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the charge transfer purpose. As the SEI is formed, the lithium ions become part of the inert SEI layer and become irreversible, i.e. these positive ions can no longer be shuttled back and forth between the anode and the cathode during subsequent charges/discharges. Therefore, it is desirable to use a minimum amount of lithium for the formation of an effective SEI layer. In addition to SEI formation, the irreversible capacity loss $Q_{ir}$ can also be attributed to graphite exfoliation caused by electrolyte/solvent co-intercalation and other side reactions.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal or semiconductor element, such as Al and Si, and "a" satisfies $0<a\leq5$) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), $LiZn$ (410 mAh/g), and $Li_3Bi$ (385 mAh/g). However, as schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

To overcome the problems associated with such mechanical degradation, three technical approaches have been proposed:

(1) reducing the size of the active material particle, presumably for the purpose of reducing the total strain energy that can be stored in a particle, which is a driving force for crack formation in the particle. However, a reduced particle size implies a higher surface area available for potentially reacting with the liquid electrolyte to form a higher amount of SEI. Such a reaction is undesirable since it is a source of irreversible capacity loss.

(2) depositing the electrode active material in a thin film form directly onto a current collector, such as a copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area (even though the capacity per unit mass can be large). Such a thin film must have a thickness less than 100 nm to be more resistant to cycling-induced cracking, further diminishing the total lithium storage capacity and the lithium storage capacity per unit electrode surface area. Such a thin-film battery has very limited scope of application. A desirable and typical electrode thickness is from 100 μm to 200 μm. These thin-film electrodes (with a thickness of <500 nm or even <100 nm) fall short of the required thickness by three (3) orders of magnitude, not just by a factor of 3.

(3) using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles. Presumably, the protective matrix provides a cushioning effect for particle expansion or shrinkage, and prevents the electrolyte from contacting and reacting with the electrode active material. Examples of high-capacity anode active particles are Si, Sn, and $SnO_2$. Unfortunately, when an active material particle, such as Si particle, expands (e.g. up to a volume expansion of 380%) during the battery charge step, the protective coating is easily broken due to the mechanical weakness and/o brittleness of the protective coating materials. There has been no high-strength and high-toughness material available that is itself also lithium ion conductive.

It may be further noted that the coating or matrix materials used to protect active particles (such as Si and Sn) are carbon, sol gel graphite, metal oxide, monomer, ceramic, and lithium oxide. These protective materials are all very brittle, weak (of low strength), and/or non-conducting (e.g., ceramic or oxide coating). Ideally, the protective material should meet the following requirements: (a) The coating or matrix material should be of high strength and stiffness so that it can help to refrain the electrode active material particles, when lithiated, from expanding to an excessive extent. (b) The protective material should also have high fracture toughness or high resistance to crack formation to avoid disintegration during repeated cycling. (c) The protective material must be inert (inactive) with respect to the electrolyte, but be a good lithium ion conductor. (d) The protective material must not provide any significant amount of defect sites that irreversibly trap lithium ions. (e) The protective material must be lithium ion-conducting as well as initially electron-conducting (when the anode electrode is made). The prior art protective materials all fall short of these requirements. Hence, it was not surprising to observe that the resulting anode typically shows a reversible specific capacity much lower than expected. In many cases, the first-cycle efficiency is extremely low (mostly lower than 80% and some even lower than 60%). Furthermore, in most cases, the electrode was not capable of operating for a large number of cycles. Additionally, most of these electrodes are not high-rate capable, exhibiting unacceptably low capacity at a high discharge rate.

Due to these and other reasons, most of prior art composite electrodes and electrode active materials have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

Complex composite particles of particular interest are a mixture of separate Si and graphite particles dispersed in a carbon matrix; e.g. those prepared by Mao, et al. ["Carbon-coated Silicon Particle Powder as the Anode Material for Lithium Batteries and the Method of Making the Same," US 2005/0136330 (Jun. 23, 2005)]. Also of interest are carbon matrix-containing complex nano Si (protected by oxide) and graphite particles dispersed therein, and carbon-coated Si particles distributed on a surface of graphite particles Again, these complex composite particles led to a low specific capacity or for up to a small number of cycles only. It appears that carbon by itself is relatively weak and brittle and the presence of micron-sized graphite particles does not improve the mechanical integrity of carbon since graphite particles are themselves relatively weak. Graphite was used in these cases presumably for the purpose of improving the electrical conductivity of the anode material. Furthermore, polymeric carbon, amorphous carbon, or pre-graphitic carbon may have too many lithium-trapping sites that irreversibly capture lithium during the first few cycles, resulting in excessive irreversibility.

In summary, the prior art has not demonstrated a material that has all or most of the properties desired for use as an anode active material in a lithium-ion battery. Thus, there is an urgent and continuing need for a new anode active material that enables a lithium-ion battery to exhibit a high cycle life, high reversible capacity, low irreversible capacity, small particle sizes (for high-rate capacity), and compatibility with commonly used electrolytes. There is also a need for a method of readily or easily producing such a material in large quantities.

Thus, it is a specific object of the present invention to meet these needs and address the issues associated the rapid capacity decay of a lithium battery containing a high-capacity anode active material.

SUMMARY OF THE INVENTION

Herein reported is an anode active material layer or electrode (an anode electrode or negative electrode) for a lithium battery that contains a very unique class of anode active materials. The electrode comprises multiple particulates (secondary particles) of an anode active material, wherein at least a particulate comprises one single or a plurality of primary particles of an anode active material (having a volume Va and occupying from 30% to 99% by weight of the particulate weight, preferably from 50% to 95% by weight), an optional electron-conducting material as a matrix, binder or filler material (occupying from 0% to 50% by weight of said particulate weight, preferably from 0.1% to 30% by weight), and pores (having a volume Vp). These components (anode active material particles, electron-conducting material, and pores) are encapsulated by a thin encapsulating layer of an electrically conducting material (e.g. a carbonaceous or graphitic material, alone or bonded by a polymer or carbon), wherein the thin encapsulating layer has a thickness from 1 nm to 10 μm, an electric conductivity from $10^{-6}$ S/cm to 20,000 S/cm and a lithium ion conductivity from $10^{-8}$ S/cm to $5\times10^{-2}$ S/cm and wherein the volume ratio Vp/Va is from 0.3/1.0 to 5.0/1.0 (preferably from 0.5/1.0 to 4.0/1.0). If a single primary particle is encapsulated, the single primary particle is itself porous having a free space to expand into without straining the thin encapsulating layer when the resulting lithium battery is charged, as illustrated in FIG. 3(A) and FIG. 3(B).

This amount of pore volume provides empty space to accommodate the volume expansion of the anode active material so that the thin encapsulating layer would not significantly expand (not to exceed 50% volume expansion of the particulate) when the lithium battery is charged. Preferably, the particulate does not increase its volume by more than 20%, further preferably less than 10% and most preferably by approximately 0% when the lithium battery is charged. Such a constrained volume expansion of the particulate would not only reduce or eliminate the volume expansion of the anode electrode but also reduce or eliminate the issue of repeated formation and destruction of a solid-electrolyte interface (SEI) phase. We have discovered that this strategy surprisingly results in significantly reduced battery capacity decay rate and dramatically increased charge/discharge cycle numbers. These results are unexpected and highly significant with great utility value.

In some embodiments, the electron-conducting material (matrix, binder, or filler) in the core or the electrically conducting material in the encapsulating shell is selected from a carbon nanotube, carbon nanofiber, nanocarbon particle, metal nanoparticle, metal nanowire, electron-conducting polymer, graphene, or a combination thereof, wherein said graphene is selected from pristine graphene, graphene oxide, reduced graphene oxide, graphene fluoride, graphene chloride, nitrogenated graphene, hydrogenated graphene, doped graphene, functionalized graphene, or a combination thereof and the graphene comprise single-layer graphene or few-layer graphene, wherein few-layer graphene is defined as a graphene platelet formed of less than 10 graphene planes. The electron-conducting polymer may be preferably selected from polyaniline, polypyrrole, polythiophene, polyfuran, a bi-cyclic polymer, a sulfonated derivative thereof, or a combination thereof. It may be noted that the electric conductivity of graphene sheets can be as high as 20,000 S/cm. When graphene sheets are bonded by a metal (e.g. Ag or Au), the electrical conductivity can far exceed 20,000 S/cm.

In some embodiments, the electron-conducting material or the first carbonaceous or graphitic material comprises a material selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof.

The thin encapsulating layer may further comprise a polymer wherein the first carbonaceous or graphitic material is dispersed in or bonded by this polymer. The polymer may contain a polymer or resin selected from an adhesive resin or thermosetting resin, a thermoplastic resin, an elastomer or rubber, a copolymer thereof, an interpenetrating network thereof, or a blend thereof.

In certain embodiments, the anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; and (h) combinations thereof. The Li alloy may contain from 0.1% to 10% by weight of a metal element selected from Zn, Ag, Au, Mg, Ni, Ti, Fe, Co, V, or a combination.

In some embodiments, the anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, lithium titanate, or a combination thereof, wherein x=1 to 2.

The anode active material is preferably in a form of nanoparticle, nanowire, nanofiber, nanotube, nanosheet, nanobelt, nanoribbon, nanodisc, nanoplatelet, or nanohorn having a thickness or diameter from 0.5 nm to 100 nm.

In some preferred embodiments, at least one of said anode active material particles is coated with a layer of carbon or graphene prior to being encapsulated.

In certain embodiments, at least one of the particulates further comprises from 0.1% to 40% by weight of a lithium ion-conducting additive dispersed in said thin encapsulating layer (substantially inside this encapsulating layer) or in ionic contact with the active material particles encapsulated therein (substantially not inside the encapsulating shell layer; instead, in the core of particulate which is like a core-shell structure. The core contains the anode active material particles, the optional electron-conducting material, the pores, and now the lithium ion-conducting additive; these components being embraced or encapsulated by the thin encapsulating layer (the shell).

In certain embodiments, the lithium ion-conducting additive is selected from $Li_2CO_3$, $Li_2O$, $Li_2C_2O_4$, LiOH, LiX, $ROCO_2Li$, $HCOLi$, $ROLi$, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

In certain embodiments, the lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl) imide, lithium bis(fluorosulfonyl)imide, lithium trifluoromethanesulfonimide (LiTFSI), an ionic liquid-based lithium salt, or a combination thereof.

In certain embodiments, the lithium ion-conducting additive contains a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bismethoxy ethoxyethoxide-phosphazene, polyvinyl chloride, polydimethylsiloxane, poly(vinylidene fluoride)-hexafluoropropylene (PVDF-HFP), a sulfonated derivative thereof, or a combination thereof.

As indicated earlier, the thin encapsulating layer may further comprise a polymer wherein the first carbonaceous or graphitic material is dispersed in or bonded by this polymer. The polymer may contain an elastomer or rubber selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) elastomer, poly(ethylene-co-butene) elastomer, styrene-ethylene-butadiene-styrene elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, a sulfonated version thereof, or a combination thereof.

When graphene is used in the particulate, the graphene sheets preferably have a lateral dimension (length or width) from 5 nm to 5 μm, more preferably from 10 nm to 1 μm, and most preferably from 10 nm to 300 nm. Shorter graphene sheets allow for easier encapsulation and enable faster lithium ion transport through the encapsulating layer.

In some embodiments, one particle or a cluster of multiple particles may be coated with or embraced by a layer of carbon or graphene. Carbon or graphene may be disposed between the particle(s) and the encapsulating shell. The anode active material particles may be coated with or embraced by a conductive protective coating, selected from a carbon material, graphene, electronically conductive polymer, conductive metal oxide, or conductive metal coating.

The particulate may further contain a graphite or carbon material mixed with the active material particles, which are all encapsulated by the encapsulating shell (but not dispersed within this thin encapsulating layer). The carbon or graphite material may be selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof.

Preferably and typically, the encapsulating shell has a lithium ion conductivity no less than $10^{-6}$ S/cm, more preferably no less than $5\times10^{-5}$ S/cm. In certain embodiments, the encapsulating shell further contains from 0.1% to 40% by weight (preferably from 1% to 30% by weight) of a lithium ion-conducting additive dispersed in the shell.

The present invention also provides a powder mass of an anode active material for a lithium battery. The powder mass comprises multiple particulates of an anode active material, wherein at least a particulate comprises one or a plurality of particles of an anode active material (having a volume Va and occupying from 30% to 99% by weight of the particulate weight, preferably from 50% to 95% by weight), an optional electron-conducting material as a matrix, binder or filler material (occupying from 0% to 50% by weight of said particulate weight), and pores (having a volume Vp). These components (anode active material particles, electron-conducting material, and pores) are encapsulated by a thin encapsulating layer of a first carbonaceous or graphitic material, wherein the thin encapsulating layer has a thickness from 1 nm to 10 μm and a lithium ion conductivity from $10^{-8}$ S/cm to $5\times10^{-2}$ S/cm and wherein the volume ratio Vp/Va is from 0.5/1.0 to 5.0/1.0.

The components materials, such as the anode active material, the electron-conducting material (as a binder, a matrix, or a filler), the lithium ion-conducting additive, and the thin encapsulating layer (the encapsulating shell), have been described in the foregoing paragraphs.

The anode active material preferably is selected from a high-capacity anode active material having a specific capacity of lithium storage greater than 372 mAh/g (e.g. Si, Ge, Sn, $SiO_x$, $SnO_2$, Al, $Co_3O_4$, etc.).

In some embodiments, the thin encapsulating layer (the shell) contains a binder or matrix material selected from a sulfonated or non-sulfonated version of natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), metallocene-based poly(ethylene-co-octene) (POE) elastomer, poly(ethylene-co-butene) (PBE) elastomer, styrene-ethylene-butadiene-styrene (SEBS) elastomer, epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof. Sulfonation imparts higher lithium ion conductivity to the elastomer.

The powder mass may further comprise, in addition to the particulates, some graphite particles, carbon particles, mesophase microbeads, carbon or graphite fibers, carbon nanotubes, graphene sheets, or a combination thereof. These additional graphite/carbon materials serve as a conductive additive and, if so desired, as a diluent to reduce the overall specific capacity of an anode electrode (for the purpose of matching the cathode which typically has a lower specific capacity). Preferably, the high-capacity anode is prelithiated (preintercalated or preloaded with lithium before the anode material is incorporated into a battery).

The present invention also provides an anode electrode that contains the presently invented particulates comprising encapsulated high-capacity anode material particles, an optional conductive additive (e.g. expanded graphite flakes, carbon black, acetylene black, or carbon nanotube), an optional resin binder (typically required), and, optionally, some amount of the common anode active materials (e.g. particles of natural graphite, synthetic graphite, hard carbon, etc.).

The present invention also provides a lithium battery containing an optional anode current collector, the presently invented anode electrode as described above, a cathode active material layer or cathode electrode, an optional cathode current collector, an electrolyte in ionic contact with the anode active material layer and the cathode active material layer and an optional porous separator. The lithium battery may be a lithium-ion battery, lithium metal battery (containing lithium metal or lithium alloy as the main anode active material and containing no intercalation-based anode active material), lithium-sulfur battery, lithium-selenium battery, or lithium-air battery.

The invention also provides a method of producing a powder mass of an anode active material for a lithium battery, the method comprising:
  (a) Dispersing an electrically conducting material (e.g. a carbonaceous or graphitic material, such as graphene sheets or expanded graphite flakes), primary particles of an anode active material (or anode active material precursor), an optional electron-conducting material (0%-50% by weight of the particulate weight), and a sacrificial material in a liquid medium to form a precursor mixture (a multi-component suspension or slurry);
  (b) forming the precursor mixture into droplets and drying the droplets into multiple particulates wherein at least one the particulates comprises particles of the carbonaceous or graphitic material (e.g. graphene sheets or expanded graphite flakes), at least one primary particle of the anode active material, the optional electron-conducting material, and the sacrificial material; and
  (c) removing the sacrificial material or thermally converting the sacrificial material into a carbon material that is bonded to at least one of the primary particle of the anode active material to obtain the anode particulates.

The primary particles of the anode active material themselves may be porous; some examples of porous primary particles having empty space to accommodate volume expansion without significantly increasing the profile or envelop of the particle are schematically illustrated in FIG. 3(B).

In certain embodiments, the step of dispensing the slurry and removing the solvent and/or polymerizing/curing the precursor to form the powder mass includes operating a procedure (e.g. micro-encapsulation) selected from pan-coating, air-suspension coating, centrifugal extrusion, vibration-nozzle encapsulation, spray-drying, coacervation-phase separation, interfacial polycondensation and interfacial cross-linking, in-situ polymerization, matrix polymerization, or a combination thereof.

In this method, the step of dispersing to form a precursor mixture may optionally further include dissolving or dispersing from 0.1% to 40% by weight of a lithium ion-conducting additive in the liquid medium or solvent. This weight percentage is based on the total weight of the dried particulate. The lithium ion-conducting additive may be selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq 4$. Alternatively or additionally, the lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato) borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

In certain embodiments, the suspension or slurry further contains an electron-conducting polymer selected from polyaniline, polypyrrole, polythiophene, polyfuran, a bi-cyclic polymer, a sulfonated derivative thereof, or a combination thereof. Alternatively or additionally, the slurry further contains a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a sulfonated derivative thereof, or a combination thereof.

The method may further comprise mixing multiple particulates of the aforementioned anode active material, a binder resin, and an optional conductive additive to form an anode electrode, which is optionally coated on an anode current collector. The method may further comprise combining the anode electrode, a cathode electrode (positive electrode), an electrolyte, and an optional porous separator into a lithium battery cell.

The method may further comprise a procedure of operating the lithium battery in such a manner that the anode is at an electrochemical potential below 1.5 V vs. Li/Li+ during at least one of the first 10 charge/discharge cycles of the battery, typically during the first 3 cycles, after the lithium battery is made. This procedure enables the particulate surfaces to become electrochemically stable.

In some embodiments, the method further comprise a procedure of operating the lithium battery in such a manner that surfaces of the particulates become electrically nonconducting (e.g. by forming a solid-electrolyte interface material on particulate surfaces) after the first 1-10 charge/discharge cycles.

The presently invented carbonaceous/graphitic material-encapsulated anode active material particles with inherent porosity or free space meet all of the criteria required of a lithium-ion battery anode material.

The anode electrode contains approximately 55% of such particulates, 37% of MCMB particles, and 8% binder (SBR rubber). The other cell has a similar anode, but having relatively pore-free Si particulates.

Figure 10A:
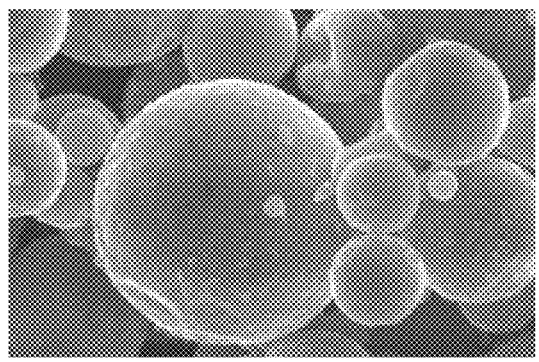

FIG. 10(A) Micron- and sub-micron-scale, inherently porous Si particles prepared by acid etching of Al—Si alloy powder.

Figure 10B:
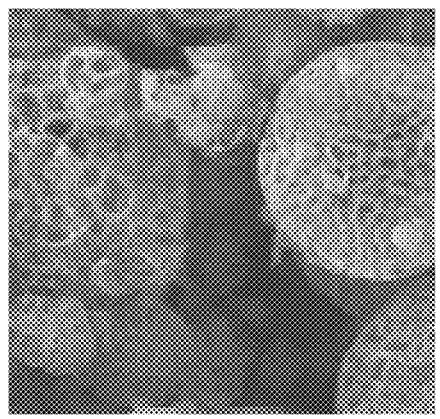

FIG. 10(B) Foam-type porous Si particle structure.

DESCRIPTION OF THE PREFERRED EMBODIMENTS

This invention is directed at the anode active material layer (negative electrode layer or anode, not including the anode current collector) containing a high-capacity anode active material for a lithium secondary battery, which is preferably a secondary battery based on a non-aqueous electrolyte, a polymer gel electrolyte, a polymer electrolyte, an ionic liquid electrolyte, a quasi-solid electrolyte, or a solid-state electrolyte. The shape of a lithium secondary battery can be cylindrical, square, button-like, etc. The present invention is not limited to any battery shape or configuration. For convenience, we will primarily use Si, Sn, and $SnO_2$ as illustrative examples of a high-capacity anode active material. This should not be construed as limiting the scope of the invention.

Figure 1A:
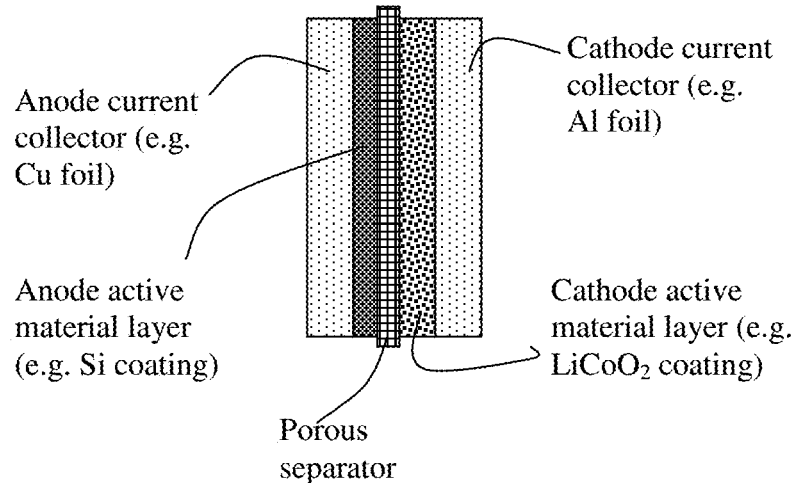
FIG. 1(A) Schematic of a prior art lithium-ion battery cell, wherein the anode layer is a thin coating of an anode active material itself.
Figure 1B:
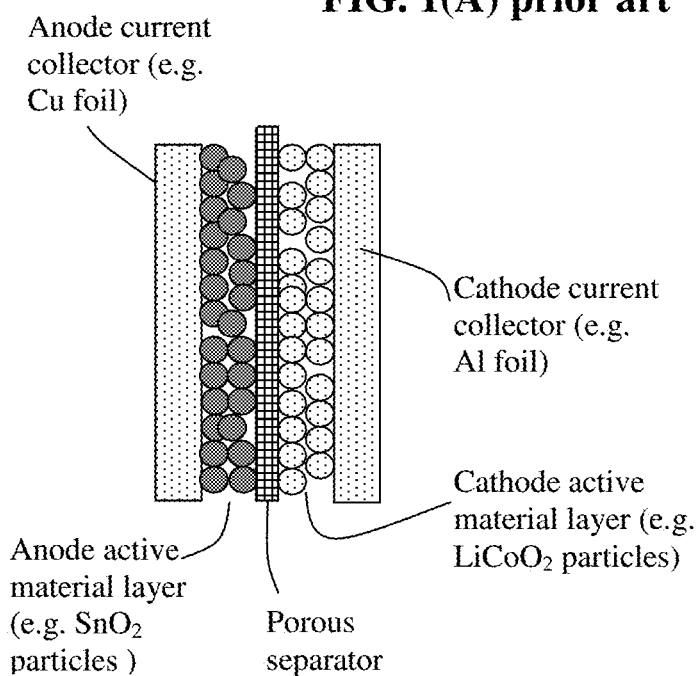
FIG. 1(B) Schematic of another prior art lithium-ion battery; the anode layer being composed of particles of an anode active material, a conductive additive (not shown) and a resin binder (not shown).

As illustrated in FIG. 1(B), a lithium-ion battery cell is typically composed of an anode current collector (e.g. Cu foil), an anode or negative electrode active material layer (i.e. anode layer typically containing particles of an anode active material, conductive additive, and binder), a porous separator and/or an electrolyte component, a cathode or positive electrode active material layer (containing a cathode active material, conductive additive, and resin binder), and a cathode current collector (e.g. Al foil). More specifically, the anode layer is composed of particles of an anode active material (e.g. graphite, Sn, $SnO_2$, or Si), a conductive additive (e.g. carbon black particles), and a resin binder (e.g. SBR or PVDF). This anode layer is typically 50-300 μm thick (more typically 100-200 μm) to give rise to a sufficient amount of current per unit electrode area.

In a less commonly used cell configuration, as illustrated in FIG. 1(A), the anode active material is deposited in a thin film form directly onto an anode current collector, such as a sheet of copper foil. This is not commonly used in the battery industry and, hence, will not be discussed further.

Figure 2A:
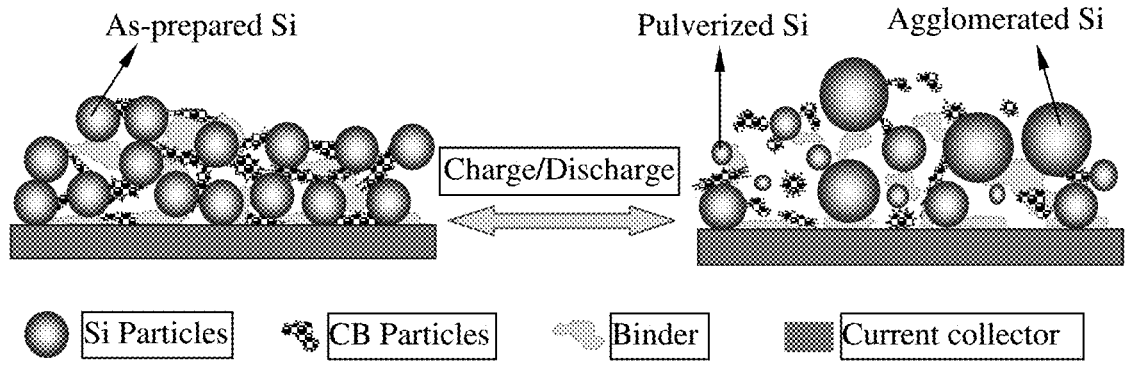
FIG. 2(A) Schematic illustrating the notion that expansion of Si particles, upon lithium intercalation during charging of a prior art lithium-ion battery, can lead to pulverization of Si particles, interruption of the conductive paths formed by the conductive additive, and loss of contact with the current collector.

In order to obtain a higher energy density cell, the anode in FIG. 1(B) can be designed to contain higher-capacity anode active materials having a composition formula of $Li_aA$ (A is a metal or semiconductor element, such as Al and Si, and "a" satisfies $0<a\leq 5$). These materials are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as discussed in the Background section, there are several problems associated with the implementation of these high-capacity anode active materials:

1) As schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

2) The approach of using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles, has failed to overcome the capacity decay problem. Presumably, the protective matrix provides a cushioning effect for particle expansion or shrinkage, and prevents the electrolyte from contacting and reacting with the electrode active material. Unfortunately, when an active material particle, such as Si particle, expands (e.g. up to a volume expansion of 380%) during the battery charge step, the protective coating is easily broken due to the mechanical weakness and/o brittleness of the protective coating materials. There has been no high-strength and high-toughness material available that is itself also lithium ion conductive.

3) The approach of using a core-shell structure (e.g. Si nanoparticle encapsulated in a carbon or $SiO_2$ shell) also has not solved the capacity decay issue. As illustrated in upper portion of FIG. 2(B), a non-lithiated Si particle can be encapsulated by a carbon shell to form a core-shell structure (Si core and carbon or $SiO_2$ shell in this example). As the lithium-ion battery is charged, the anode active material (carbon- or $SiO_2$-encapsulated Si particle) is intercalated with lithium ions and, hence, the Si particle expands. Due to the brittleness of the encapsulating shell (carbon), the shell is broken into segments, exposing the underlying Si to electrolyte and subjecting the Si to undesirable reactions with electrolyte during repeated charges/discharges of the battery. These reactions continue to consume the electrolyte and reduce the cell's ability to store lithium ions.

Figure 2B:
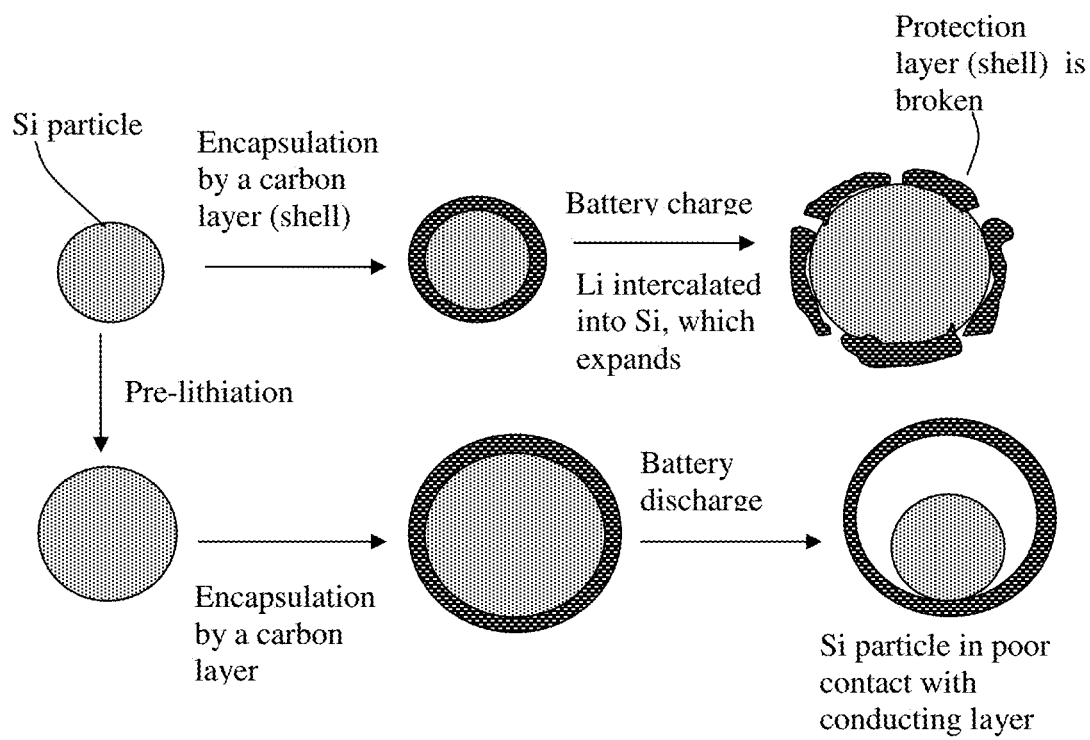
FIG. 2(B) illustrates the issues associated with prior art anode active material; for instance, a non-lithiated Si particle encapsulated by a protective shell (e.g. carbon shell) in a core-shell structure inevitably leads to breakage of the shell and that a prelithiated Si particle encapsulated with a protective layer leads to poor contact between the contracted Si particle and the rigid protective shell during battery discharge.

4) Referring to the lower portion of FIG. 2(B), wherein the Si particle has been prelithiated with lithium ions; i.e. has been pre-expanded in volume. When a layer of carbon (as an example of a protective material) is encapsulated around the prelithiated Si particle, another core-shell structure is formed. However, when the battery is discharged and lithium ions are released (de-intercalated) from the Si particle, the Si particle contracts, leaving behind a large gap between the protective shell and the Si particle. Such a configuration is not conducive to lithium intercalation of the Si particle during the subsequent battery charge cycle due to the gap and the poor contact of Si particle with the protective shell (through which lithium ions can diffuse). This would significantly curtail the lithium storage capacity of the Si particle particularly under high charge rate conditions.

In other words, there are several conflicting factors that must be considered concurrently when it comes to the design and selection of an anode active material in terms of material type, shape, size, porosity, and electrode layer thickness. Thus far, there has been no effective solution offered by any prior art teaching to these conflicting problems. We have solved these challenging issues that have troubled battery designers and electrochemists alike for more than 30 years by developing the approach of highly porous particulates (secondary particles) each comprising one or multiple primary particles of an anode active material, an optional conducting material (as a matrix, binder or filler), and pores that can accommodate the volume expansion of the primary particle(s) of the anode active material.

The present invention provides an anode electrode comprising multiple particulates (secondary particles) of an anode active material (plus an optional resin binder and/or an optional conductive additive in the electrode), wherein at least a particulate (secondary particle) comprises one or a plurality of primary particles of an anode active material and pores being encapsulated by a thin layer of a first carbonaceous or graphitic material (the encapsulating shell) that has a thickness from 1 nm to 10 μm. The total anode active material particle volume is Va and the pores have a total volume Vp wherein the Vp/Va ratio is preferably from 0.3/1.0 to 5.0/1.0 (preferably from 0.5/1.0 to 4.0/1.0).

This encapsulating shell may contain just the first carbonaceous or graphitic material alone (e.g. graphene and/or amorphous carbon) without using a resin binder or matrix. Alternatively, the first carbonaceous or graphitic material may be bonded by a binder (e.g. a resin) or dispersed in a resin matrix. Preferably, the encapsulating shell has a thickness from 1 nm to 10 µm (preferably less than 100 nm and most preferably <10 nm), and a lithium ion conductivity from $10^{-8}$ S/cm to $10^{-2}$ S/cm (more typically from $10^{-5}$ S/cm to $10^{-3}$ S/cm). The encapsulating shell preferably has an electrical conductivity from $10^{-7}$ S/cm to 3,000 S/cm (more typically from $10^{-3}$ S/cm to 1000 S/cm) when measured at room temperature on a separate cast thin film 20 µm thick. Preferably, the anode active material is a high-capacity anode active material having a specific lithium storage capacity greater than 372 mAh/g (which is the theoretical capacity of graphite).

Figure 3A:
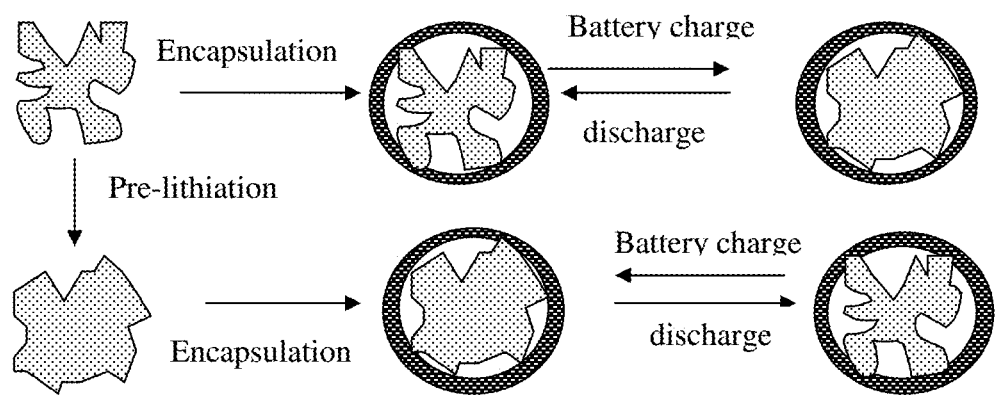
FIG. 3(A) Schematic of the presently invented encapsulated single primary particle of an anode active material (prelithiated or unlithiated). The primary particle is porous having free space to expand into without straining or stressing the encapsulating shell.
Figure 3B:
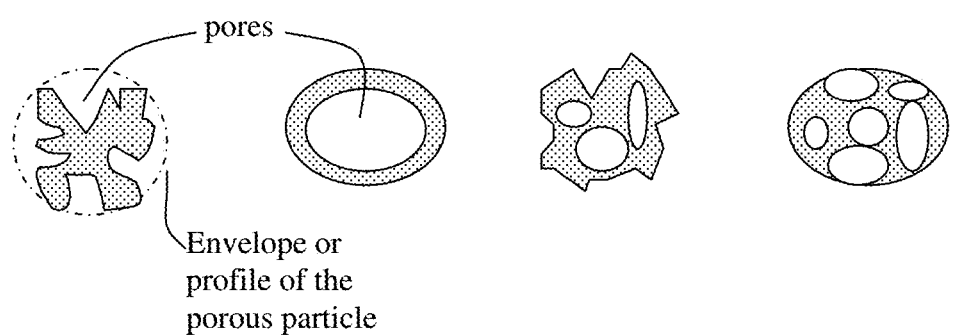
FIG. 3(B) Some examples of porous primary particles of an anode active material.

If a single primary particle is encapsulated, the single primary particle is itself porous having a free space to expand into without straining the thin encapsulating layer when the resulting lithium battery is charged, as illustrated in FIG. 3(A) and FIG. 3(B). FIG. 3(B) provides some examples of a porous primary particle (e.g. porous Si, Ge, SiO, Sn, $SnO_2$, etc.). The inherent pores or empty space allow the particle to expand into the free space without an overall volume increase of the particle profile or envelop. These examples are not to be construed as limiting the scope of the invention.

This amount of pore volume inside the particulate (in the core portion, not the shell portion) provides empty space to accommodate the volume expansion of the anode active material so that the thin encapsulating layer would not significantly expand (not to exceed 50% volume expansion of the particulate) when the lithium battery is charged. Preferably, the particulate does not increase its volume by more than 20% a, further preferably less than 10% and most preferably by approximately 0% when the lithium battery is charged. Such a constrained volume expansion of the particulate would not only reduce or eliminate the volume expansion of the anode electrode but also reduce or eliminate the issue of repeated formation and destruction of a solid-electrolyte interface (SEI) phase. We have discovered that this strategy surprisingly results in significantly reduced battery capacity decay rate and dramatically increased charge/discharge cycle numbers. These results are unexpected and highly significant with great utility value.

In some embodiments, the electron-conducting material (as a matrix, binder, or filler encapsulated by the shell, but not in the shell per se) is selected from a carbon nanotube, carbon nanofiber, nanocarbon particle, metal nanoparticle, metal nanowire, electron-conducting polymer, graphene, or a combination thereof, wherein the graphene may be selected from pristine graphene, graphene oxide, reduced graphene oxide, graphene fluoride, graphene chloride, nitrogenated graphene, hydrogenated graphene, doped graphene, functionalized graphene, or a combination thereof and the graphene comprise single-layer graphene or few-layer graphene, wherein few-layer graphene is defined as a graphene platelet formed of less than 10 graphene planes. The electron-conducting polymer may be preferably selected from polyaniline, polypyrrole, polythiophene, polyfuran, a bicyclic polymer, a sulfonated derivative thereof, or a combination thereof.

In some embodiments, the electron-conducting material (in the core region, not the encapsulating shell) or the first carbonaceous or graphitic material (in the encapsulating shell) comprises a material selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof.

The thin encapsulating layer may further comprise a polymer wherein the first carbonaceous or graphitic material is dispersed in or bonded by this polymer. The polymer may contain a polymer or resin selected from an adhesive resin or thermosetting resin, a thermoplastic resin, an elastomer or rubber, a copolymer thereof, an interpenetrating network thereof, or a blend thereof.

Figure 4:
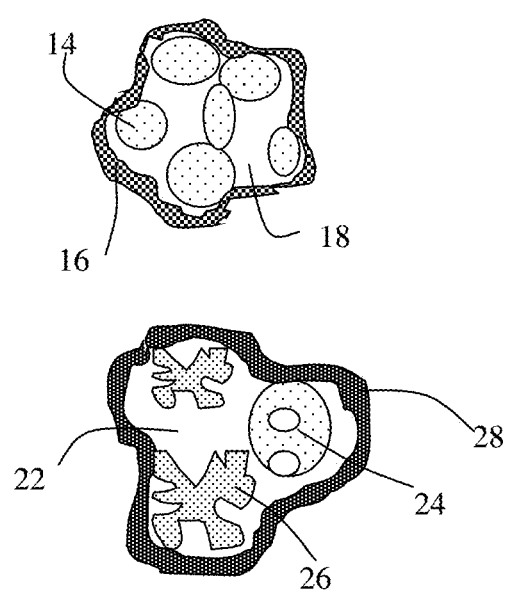
FIG. 4 Schematic of two examples of particulates comprising multiple primary particles of an anode active material (having a total volume Va) and pores (having a total volume Vp, wherein the Vp/Va ratio is preferably from 0.5/1.0 to 5.0/1.0.

Schematically shown in FIG. 4 are two examples of the presently invented particulates. The first one is a multiple-particle particulate containing multiple anode active material particles 14 (e.g. Si nanoparticles), along with pores (e.g. 18) and optionally along with other active materials (e.g. particles of graphite or hard carbon, not shown) or a conductive material, which are encapsulated by an encapsulating shell 16. The second example is a multiple-particle particulate containing multiple primary particles (porous particles 24, 26) of an anode active material (e.g. Si nanoparticles) optional coated with a conductive protection layer, along with a conductive material (not shown), optionally along with other active materials (e.g. particles of graphite or hard carbon, not shown), and pores 22, which are encapsulated by a shell 28. These anode active material primary particles can be prelithiated or non-prelithiated.

As schematically illustrated in the upper portion of FIG. 3(A), a non-lithiated porous Si particle can be encapsulated by an encapsulating shell to form a core-shell structure (Si and the pores being the core and a graphene/carbon layer being the shell in this example). As the lithium-ion battery is charged, the anode active material (encapsulated Si particle) is intercalated with lithium ions and, hence, the Si particle expands. Due to the inherent pores (free space) of the Si particle capable of accommodating its own volume expansion, the encapsulating shell will not be subjected to any significant stress or strain. Hence, the shell will not be broken into segments (in contrast to the broken carbon shell in a conventional core-shell structure). That the shell remains intact, preventing exposure of the underlying Si to electrolyte and, thus, prevents the Si from undergoing undesirable reactions with electrolyte during repeated charges/discharges of the battery.

Alternatively, referring to the lower portion of FIG. 3(A), wherein the porous Si particle has been prelithiated with lithium ions; i.e. has been pre-expanded in volume. When a layer of carbonaceous or graphitic shell is made to encapsulate around the prelithiated Si particle, another core-shell structure is formed. When the battery is discharged and lithium ions are released (de-intercalated) from the Si particle, the Si particle contracts. However, the porous primary particle may be so designed that it maintains some contact spots with the shell. Such a configuration is more amenable to subsequent lithium intercalation and de-intercalation of the Si particle. The stable encapsulating shell, not overly stressed or strained, imparts long-term cycling stability to a lithium battery featuring a high-capacity anode active material (such as Si, Sn, $SnO_2$, $Co_3O_4$, etc.).

The anode active material may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li; and (h) combinations thereof. Particles of Li or Li alloy (Li alloy containing from 0.1% to 10% by weight of Zn, Ag, Au, Mg, Ni, Ti, Fe, Co, or V element), particularly surface-stabilized Li particles (e.g. wax-coated Li particles), were found to be good anode active material per se or an extra lithium source to compensate for the loss of Li ions that are otherwise supplied only from the cathode active material. The presence of these Li or Li-alloy particles encapsulated inside a carbonaceous/graphitic material shell was found to significantly improve the cycling performance of a lithium cell.

Prelithiation of an anode active material can be conducted by several methods (chemical intercalation, ion implementation, and electrochemical intercalation). Among these, the electrochemical intercalation is the most effective. Lithium ions can be intercalated into non-Li elements (e.g. Si, Ge, and Sn) and compounds (e.g. $SnO_2$ and $Co_3O_4$) up to a weight percentage of 54.68% (see Table 1 below). For Zn, Mg, Ag, and Au encapsulated inside an elastomer shell, the amount of Li can reach 99% by weight.

TABLE 1

Lithium storage capacity of selected non-Li elements.

| Intercalated compound | Atomic weight of Li, g/mole | Atomic weight of active material, g/mole | Max. wt. % of Li |
|---|---|---|---|
| $Li_4Si$ | 6.941 | 28.086 | 49.71 |
| $Li_{4.4}Si$ | 6.941 | 28.086 | 54.68 |
| $Li_{4.4}Ge$ | 6.941 | 72.61 | 30.43 |
| $Li_{4.4}Sn$ | 6.941 | 118.71 | 20.85 |
| $Li_3Cd$ | 6.941 | 112.411 | 14.86 |
| $Li_3Sb$ | 6.941 | 121.76 | 13.93 |
| $Li_{4.4}Pb$ | 6.941 | 207.2 | 13.00 |
| LiZn | 6.941 | 65.39 | 7.45 |
| $Li_3Bi$ | 6.941 | 208.98 | 8.80 |

The particles of the anode active material may be in the form of a nanoparticle, nanowire, nanofiber, nanotube, nanosheet, nanoplatelet, nanodisc, nanobelt, nanoribbon, or nanohorn. They can be non-lithiated (when incorporated into the anode active material layer) or prelithiated to a desired extent (up to the maximum capacity as allowed for a specific element or compound.

Preferably and typically, the encapsulating shell has a lithium ion conductivity from 10, S/cm to $5 \times 10^{-2}$ S/cm, more preferably and typically greater than $10^{-5}$ S/cm, further more preferably and typically greater than $10^{-4}$ S/cm, and most preferably no less than $10^{-3}$ S/cm. In some embodiments, the shell further contains from 0.1% to 40% (preferably 1% to 35%) by weight of a lithium ion-conducting additive dispersed in a polymer matrix material (which also contains the carbonaceous or graphitic material dispersed therein).

A broad array of polymers can be used in the encapsulating layer as a binder or matrix material. Encapsulation means substantially fully embracing the particle(s) without allowing the particle to be in direct contact with electrolyte in the battery. The polymer may contain a polymer or resin selected from an adhesive resin or thermosetting resin, a thermoplastic resin, an elastomer or rubber, a copolymer thereof, an interpenetrating network thereof, or a blend thereof.

The elastomeric matrix material may be selected from a sulfonated or non-sulfonated version of natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), metallocene-based poly(ethylene-co-octene) (POE) elastomer, poly(ethylene-co-butene) (PBE) elastomer, styrene-ethylene-butadiene-styrene (SEBS) elastomer, epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

The urethane-urea copolymer film usually consists of two types of domains, soft domains and hard ones. Entangled linear backbone chains consisting of poly(tetramethylene ether) glycol (PTMEG) units constitute the soft domains, while repeated methylene diphenyl diisocyanate (MDI) and ethylene diamine (EDA) units constitute the hard domains. The lithium ion-conducting additive can be incorporated in the soft domains or other more amorphous zones.

In certain embodiments, the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

In certain embodiments, the lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl) imide, lithium bis(fluorosulfonyl)imide, lithium trifluoromethanesulfonimide (LiTFSI), an ionic liquid-based lithium salt, or a combination thereof.

In certain embodiments, the lithium ion-conducting additive contains a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a sulfonated derivative thereof, or a combination thereof.

The lithium ion-conducting material described above may also be incorporated in the core portion of the particulate and be in ionic contact with the primary particles of the anode active material.

The electron-conducting material in the core may be selected from a carbon nanotube (CNT), carbon nanofiber, graphene, nanocarbon particles, metal nanowires, a conducting polymer, etc. The electron-conducting polymer may be selected from polyaniline, polypyrrole, polythiophene, polyfuran, a bi-cyclic polymer, derivatives thereof (e.g. sulfonated versions), or a combination thereof.

The graphitic material in the encapsulating shell may also comprise graphene sheets or expanded graphite lakes.

A graphene sheet or nanographene platelet (NGP) is composed of one basal plane (graphene plane) or multiple basal planes stacked together in the thickness direction. In a graphene plane, carbon atoms occupy a 2-D hexagonal lattice in which carbon atoms are bonded together through strong in-plane covalent bonds. In the c-axis or thickness direction, these graphene planes may be weakly bonded together through van der Waals forces. An NGP can have a platelet thickness from less than 0.34 nm (single layer) to 100 nm (multi-layer). For the present electrode use, the preferred thickness is <10 nm, more preferably <3 nm (or <10 layers, also referred to as few-layer graphene), and most preferably single-layer graphene. Thus, the shell in the presently invented shell preferably contains mostly single-layer graphene, but could make use of some few-layer graphene (less than 10 layers or 10 graphene planes). The graphene sheet may contain a small amount (typically <25% by weight) of non-carbon elements, such as hydrogen, nitrogen, fluorine, and oxygen, which are attached to an edge or surface of the graphene plane.

Graphene sheets may be oxidized to various extents during their preparation, resulting in graphite oxide (GO) or graphene oxide. Hence, in the present context, graphene preferably or primarily refers to those graphene sheets containing no or low oxygen content; but, they can include GO of various oxygen contents. Further, graphene may be fluorinated to a controlled extent to obtain graphite fluoride, or can be doped using various dopants, such as boron and nitrogen.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 30 minutes to 5 days). In order to reduce the time required to produce a precursor solution or suspension, one may choose to oxidize the graphite to some extent for a shorter period of time (e.g., 30 minutes) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. The un-broken graphite worms or individual graphite flakes are then re-dispersed in water, acid, or organic solvent and ultrasonicated to obtain a graphene polymer solution or suspension.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce the separated nanoscaled platelets, which are pristine, non-oxidized NGPs.

NGPs can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS).

The laminar graphite materials used in the prior art processes for the production of the GIC, graphite oxide, and subsequently made exfoliated graphite, flexible graphite sheets, and graphene platelets are, in most cases, natural graphite. However, the present invention is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nanofiber, carbon nanotube, mesophase carbon microbead (MCMB) or carbonaceous microsphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

Graphene sheets may be oxidized to various extents during their preparation, resulting in graphite oxide or graphene oxide (GO). Hence, in the present context, graphene preferably or primarily refers to those graphene sheets containing no or low oxygen content; but, they can include GO of various oxygen contents. Further, graphene may be fluorinated to a controlled extent to obtain graphene fluoride.

Pristine graphene may be produced by direct ultrasonication (also known as liquid phase production) or supercritical fluid exfoliation of graphite particles. These processes are well-known in the art. Multiple pristine graphene sheets may be dispersed in water or other liquid medium with the assistance of a surfactant to form a suspension.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The present invention also provides a process for preparing the presently invented anode particulates in a powder form or in an anode electrode. In one preferred embodiment, the process comprises:

(A) Dispersing graphene sheets or expanded graphite flakes (2 examples of a carbonaceous or graphitic material), primary particles of an anode active material (or anode active material precursor), an optional electron-conducting material (0/o %-40% by weight of the particulate weight), and a sacrificial material in a liquid medium to form a precursor mixture (a multi-component suspension);

(B) forming the precursor mixture into droplets and drying the droplets into multiple particulates wherein at least one the particulates comprises graphene sheets or expanded graphite flakes, primary particles of the anode active material, the optional electron-conducting material, and the sacrificial material; and (C) removing the sacrificial material or thermally converting the sacrificial material into a carbon material that is bonded to at least one of the primary particle of the anode active material to obtain the anode particulates.

The step of drying the multi-component suspension to form droplets and drying the droplets is most preferably conducted using a spray-drying, spray-pyrolysis, fluidized-bed drying procedure, or any procedure that involves an atomization or aerosolizing step.

The step of removing the sacrificial material may involve a procedure as simple as melting the sacrificial material (e.g. wax) and allowing the melt to migrate out of the particulate through some of the minute voids or gaps initially present in the encapsulating shell. These gaps or voids may be later sealed with a polymer or carbon material (e.g. CVD carbon or polymeric carbon). Alternatively, the sacrificial material may be dissolved in a liquid (e.g. sugar or salt dissolved in water or a polymer dissolved in a solvent). The sacrificial material (e.g. a polymer) may be heat-treated (carbonized) to become carbon and pores.

The step of converting may comprise a procedure of chemically or thermally reducing the graphene precursor to reduce or eliminate oxygen or fluorine content and other non-carbon elements of the graphene precursor; the graphene precursor may contain graphene oxide or graphene fluoride. Upon conversion, the graphene in the particulate has an oxygen content typically less than 5% by weight. The amount of pores depends upon the carbon yield of the polymer, typically from 5% (e.g. wax, PE, PP, etc.) to 60% (e.g. phenolic resin, polyimide, etc.). In other words, 40%-95% of the volume originally occupied by the sacrificial polymer is now converted into pores.

In another embodiment, the step of preparing the precursor mixture may comprise: (A) dispersing or exposing a laminar graphite material in a fluid of an intercalant and/or an oxidant to obtain a graphite intercalation compound (GIC) or graphite oxide (GO); (B) exposing the resulting GIC or GO to a thermal shock at temperature for a period of time sufficient to obtain exfoliated graphite or graphite worms; (C) dispersing the exfoliated graphite or graphite worms in a liquid medium containing an acid, an oxidizing agent, and/or an organic solvent at a desired temperature for a duration of time until the exfoliated graphite is converted into a graphene oxide dissolved in the liquid medium to form a graphene solution; and (D) adding a desired amount of the anode precursor material particles and a sacrificial material to the graphene solution to form the precursor mixture in a suspension, slurry or paste form.

Alternatively, the process may begin with the preparation of pristine graphene, instead of graphene oxide. In other words, the step of preparing the precursor mixture comprises: (a) preparing a suspension containing pristine graphene sheets dispersed in a liquid medium; and (b) adding a desired amount of primary particles of an anode active material or precursor and a sacrificial material in the graphene suspension to form a paste or slurry. The slurry is then formed into particulates, followed by removal or thermal conversion of the sacrificial material.

In some embodiments, the step of preparing the precursor mixture may comprise adding a polymer into the liquid medium, allowing the polymer to get at least partially dissolved in the liquid medium (e.g. polyethylene oxide dissolved in water or phenolic resin dissolved in alcohol or acetone) to form a solution. In this situation, the liquid medium would comprise the following species dissolved or dispersed therein: graphene sheets or expanded graphite flakes (as 2 examples of a carbonaceous or graphitic material), primary particles of an anode active material (or anode active material precursor), an optional electron-conducting material (0%-40% by weight of the particulate weight), and a sacrificial material. The liquid medium along with these species form a suspension or slurry for subsequent droplet formation and drying to produce particulates.

The polymer serves as a binder or matrix material in the encapsulating shell; certain proportion of the polymer may be present in the core region. The polymer may be a thermosetting resin, a thermoplastic, an elastomer or rubber, a semi-interpenetrating network (semi-IPN), a simultaneous interpenetrating network (SIPN), etc. The polymer that stays inside the core portion of the particulate may be considered as a sacrificial material to be later thermally converted into a carbon material and pores. The polymer in the encapsulating shell may also be thermally converted into carbon, which can chemically bond the carbonaceous or graphitic material (e.g. graphene sheets) in the shell together.

Some elastomers are originally in an unsaturated chemical state (unsaturated rubbers) that can be cured by sulfur vulcanization to form a cross-linked polymer that is highly elastic (hence, an elastomer). Prior to vulcanization, these polymers or oligomers are soluble in an organic solvent to form a polymer solution. Graphene sheets or expanded graphite flakes can be chemically functionalized to contain functional groups (e.g. —OH, —COOH, $NH_2$, etc.) that can react with the polymer or its oligomer. The graphene- or expanded graphite flake-bonded oligomer or polymer may then be dispersed in a liquid medium (e.g. a solvent) to form a solution or suspension. Particles of an anode active material (e.g. $SnO_2$ nanoparticles and Si nanowires), along with a sacrificial material, can be dispersed in this polymer solution or suspension to form a slurry of an active material particle-polymer mixture. This suspension can then be subjected to a solvent removal treatment while individual particles remain substantially separated from one another. The graphene-bonded or expanded graphite flake-bonded polymer precipitates out to deposit on surfaces of these active material particles. This can be accomplished, for instance, via spray drying.

Unsaturated rubbers that can be vulcanized to become elastomer include natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), Some elastomers are saturated rubbers that cannot be cured by sulfur vulcanization; they are made into a rubbery or elastomeric material via different means: e.g. by having a copolymer domain that holds other linear chains together. Graphene sheets can be solution- or melt-dispersed into the elastomer to form a graphene/elastomer composite. Each of these graphene/elastomer composites can be used to encapsulate particles of an anode active material by one of several means: melt mixing (followed by pelletizing and ball-milling, for instance), solution mixing (dissolving the anode active material particles in an uncured polymer, monomer, or oligomer, with or without an organic solvent) followed by drying (e.g. spray drying), interfacial polymerization, or in situ polymerization of elastomer in the presence of anode active material particles.

Saturated rubbers and related elastomers in this category include EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, and protein elastin. Polyurethane and its copolymers (e.g. urea-urethane copolymer) are particularly useful elastomeric shell materials for encapsulating anode active material particles.

Several micro-encapsulation processes require the polymer (e.g. elastomer) to be dissolvable in a solvent. Fortunately, all the polymers used herein are soluble in some common solvents. Even for those rubbers that are not very soluble after vulcanization, the un-cured polymer (prior to vulcanization or curing) can be readily dissolved in a common organic solvent to form a solution. This solution can then be used to serve as a binder or matrix material in the encapsulating shell that encapsulates solid particles via several of the micro-encapsulation methods to be discussed in what follows. Upon encapsulation, the polymer-carbonaceous/graphitic shell is then vulcanized or cured. Some examples of rubbers and their solvents are polybutadiene (2-methyl pentane+n-hexane or 2,3-dimethylbutane), styrene-butadiene rubber (toluene, benzene, etc.), butyl rubber (n-hexane, toluene, cyclohexane), etc. The SBR can be vulcanized with different amounts sulfur and accelerator at 433° K in order to obtain different network structures and crosslink densities. Butyl rubber (IIR) is a copolymer of isobutylene and a small amount of isoprene (e.g. about 98% polyisobutylene with 2% isoprene distributed randomly in the polymer chain). Elemental sulfur and organic accelerators (such as thiuram or thiocarbamates) can be used to cross-link butyl rubber to different extents as desired. Thermoplastic elastomers are also readily soluble in solvents.

There are three broad categories of micro-encapsulation methods that can be implemented to produce polymer composite-encapsulated particles of an anode active material: physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

Pan-Coating Method:

The pan coating process involves tumbling the active material particles in a pan or a similar device while the encapsulating material (e.g. elastomer monomer/oligomer, elastomer melt, elastomer/solvent solution) is applied slowly until a desired encapsulating shell thickness is attained.

Air-Suspension Coating Method:

In the air suspension coating process, the solid particles (core material) are dispersed into the supporting air stream in an encapsulating chamber. A controlled stream of a polymer-solvent solution (elastomer or its monomer or oligomer dissolved in a solvent; or its monomer or oligomer alone in a liquid state) is concurrently introduced into this chamber, allowing the solution to hit and coat the suspended particles. These suspended particles are encapsulated (fully coated) with polymers while the volatile solvent is removed, leaving a very thin layer of polymer (elastomer or its precursor, which is cured/hardened subsequently) on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal Extrusion:

Anode active materials may be encapsulated using a rotating extrusion head containing concentric nozzles. In this process, a stream of core fluid (slurry containing particles of an anode active material dispersed in a solvent) is surrounded by a sheath of shell solution or melt. The suspension may also contain a sacrificial material and an optional conducting material. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational Nozzle Encapsulation Method:

Core-shell encapsulation or matrix-encapsulation of an anode active material (along with a sacrificial material, for instance) can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the anode active material. The solidification can be done according to the used gelation system with an internal gelation (e.g. sol-gel processing, melt) or an external (additional binder system, e.g. in a slurry).

Spray-Drying:

Spray drying may be used to encapsulate particles of an active material when the active material is dissolved or suspended in a melt or polymer solution to form a suspension. The suspension may also contain a sacrificial material and an optional conducting material. In spray drying, the liquid feed (solution or suspension) is atomized to form droplets which, upon contacts with hot gas, allow solvent to get vaporized and thin polymer shell to fully embrace the solid particles of the active material.

Coacervation-Phase Separation:

This process consists of three steps carried out under continuous agitation:

(a) Formation of three immiscible chemical phases: liquid manufacturing vehicle phase, core material phase and encapsulation material phase. The core material is dispersed in a solution of the encapsulating polymer (elastomer or its monomer or oligomer). The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.

(b) Deposition of encapsulation shell material: core material being dispersed in the encapsulating polymer solution, encapsulating polymer material coated around core particles, and deposition of liquid polymer embracing around core particles by polymer adsorbed at the interface formed between core material and vehicle phase; and (c) Hardening of encapsulating shell material: shell material being immiscible in vehicle phase and made rigid via thermal, cross-linking, or dissolution techniques.

Interfacial Polycondensation and Interfacial Cross-Linking:

Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A solution of the anode active material and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form an elastomer shell material.

In-Situ Polymerization:

In some micro-encapsulation processes, active materials particles are fully coated with a monomer or oligomer first. Then, direct polymerization of the monomer or oligomer is carried out on the surfaces of these material particles.

Matrix Polymerization:

This method involves dispersing and embedding a core material in a polymeric matrix during formation of the particles. This can be accomplished via spray-drying, in which the particles are formed by evaporation of the solvent from the matrix material. Another possible route is the notion that the solidification of the matrix is caused by a chemical change.

A variety of synthetic methods may be used to sulfonate an elastomer or rubber: (i) exposure to sulfur trioxide in vapor phase or in solution, possibly in presence of Lewis bases such as triethyl phosphate, tetrahydrofuran, dioxane, or amines; (ii) chlorosulfonic acid in diethyl ether; (iii) concentrated sulfuric acid or mixtures of sulfuric acid with alkyl hypochlorite; (iv) bisulfites combined to dioxygen, hydrogen peroxide, metallic catalysts, or peroxo derivates; and (v) acetyl sulfate.

Sulfonation of an elastomer or rubber may be conducted before, during, or after curing of the elastomer or rubber. Further, sulfonation of the elastomer or rubber may be conducted before or after the particles of an electrode active material are embraced or encapsulated by the elastomer/rubber or its precursor (monomer or oligomer). Sulfonation of an elastomer or rubber may be accomplished by exposing the elastomer/rubber to a sulfonation agent in a solution state or melt state, in a batch manner or in a continuous process. The sulfonating agent may be selected from sulfuric acid, sulfonic acid, sulfur trioxide, chlorosulfonic acid, a bisulfate, a sulfate (e.g. zinc sulfate, acetyl sulfate, etc.), a mixture thereof, or a mixture thereof with another chemical species (e.g. acetic anhydride, thiolacetic acid, or other types of acids, etc.). In addition to zinc sulfate, there are a wide variety of metal sulfates that may be used as a sulfonating agent; e.g. those sulfates containing Mg, Ca, Co, Li, Ba, Na, Pb, Ni, Fe, Mn, K, Hg, Cr, and other transition metals, etc.

For instance, a triblock copolymer, poly(styrene-isobutylene-styrene) or SIBS, may be sulfonated to several different levels ranging from 0.36 to 2.04 mequiv./g (13 to 82 mol % of styrene; styrene being 19 mol % of the unsulfonated block copolymer). Sulfonation of SIBS may be performed in solution with acetyl sulfate as the sulfonating agent. First, acetic anhydride reacts with sulfuric acid to form acetyl sulfate (a sulfonating agent) and acetic acid (a by-product). Then, excess water is removed since anhydrous conditions are required for sulfonation of SIBS. The SIBS is then mixed with the mixture of acetyl sulfate and acetic acid. Such a sulfonation reaction produces sulfonic acid substituted to the para-position of the aromatic ring in the styrene block of the polymer. Elastomers having an aromatic ring may be sulfonated in a similar manner.

A sulfonated elastomer also may be synthesized by copolymerization of a low level of functionalized (i.e. sulfonated) monomer with an unsaturated monomer (e.g. olefinic monomer, isoprene monomer or oligomer, butadiene monomer or oligomer, etc.).

Example 1: Graphene Oxide from Sulfuric Acid Intercalation and Exfoliation of MCMBs and Production of Graphene/Carbon-Encapsulated Particles MCMB (mesocarbon microbeads) were supplied by China Steel Chemical Co. This material has a density of about 2.24 g/cm³ with a median particle size of about 16 µm. MCMBs (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace preset at a desired temperature, 800° C.-1,100° C. for 30-90 seconds to obtain graphene samples. A small quantity of graphene was mixed with water and ultrasonicated at 60-W power for 10 minutes to obtain a suspension. A small amount was sampled out, dried, and investigated with TEM, which indicated that most of the NGPs were between 1 and 10 layers. The oxygen content of the graphene powders (GO or RGO) produced was from 0.1% to approximately 25%, depending upon the exfoliation temperature and time.

Particles of anode active materials (Si, Sn, $SnO_2$, $SiO_x$, etc., respectively) and a sacrificial material (e.g. sub-micron SBR latex particles, polyethylene oxide, etc.) were then dispersed into this suspension to form a slurry. The slurry was then spray-dried to form particulates containing a core of anode active material particles, graphene sheets, and a sacrificial material being embraced by an encapsulating shell of graphene or graphene-polymer composite. Some of the particulates were then subjected to heat treatments that convert the polymer (e.g. SBR and PEO) into carbon and pores. The sample was typically heat-treated at 350-500° C. for 0.5-2 hours and 750-1,000° C. for 0.3-3 hours to convert the sacrificial polymer into carbon and pores. Surprisingly, the converted carbon along with the graphene sheets in the encapsulating shell on the exterior surface of the particulate somehow form a relatively pore-free skin layer and yet, in contrast, the volume originally occupied by the polymer is turned into pores with some residual carbon that serves as an electron-conducting material for the anode active material particles.

Example 2: Oxidation and Exfoliation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798, 878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 4. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace preset at 1,050° C. to obtain highly exfoliated graphite. The exfoliated graphite was dispersed in water along with a 1% surfactant at 45° C. in a flat-bottomed flask and the resulting graphene oxide (GO) suspension was subjected to ultrasonication for a period of 15 minutes to obtain a homogeneous graphene-water suspension.

Particles of anode active materials (Si, Sn, $SnO_2$, $SiO_x$, etc., respectively) and a sacrificial material (e.g. sugar, pitch particle, etc.) were then dispersed into this suspension to form a slurry. The slurry was then spray-dried to form particulates containing a core of anode active material particles, graphene sheets, and a sacrificial material being embraced by an encapsulating shell of overlapped graphene sheets. Some of the particulates were then subjected to heat treatments that convert the sacrificial material into carbon and pores. Again, surprisingly, the converted carbon along with the graphene sheets in the encapsulating shell on the exterior surface of the particulate somehow form a relatively pore-free skin layer and yet, in contrast, the volume originally occupied by the sacrificial material is turned into pores with some residual carbon that serves as an electron-conducting material for the anode active material particles.

Example 3: Preparation of Pristine Graphene Sheets

Pristine graphene sheets were produced by using the direct ultrasonication or liquid-phase exfoliation process. In a typical procedure, five grams of graphite flakes, ground to approximately 20 μm in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets were pristine graphene that had never been oxidized and were oxygen-free and relatively defect-free. There are substantially no other non-carbon elements. These graphene sheets were used as a conducting material in the core or as a shell carbonaceous/graphitic material.

Example 4: Preparation of Graphene Fluoride (GF) Sheets

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). A pre-cooled Teflon reactor was filled with 20-30 mL of liquid pre-cooled $ClF_3$, and then the reactor was closed and cooled to liquid nitrogen temperature. Subsequently, no more than 1 g of HEG was put in a container with holes for $ClF_3$ gas to access the reactor. After 7-10 days, a gray-beige product with approximate formula $C_2F$ was formed. GF sheets were then dispersed in halogenated solvents to form suspensions. These graphene sheets were used as a conducting material in the core or as a shell carbonaceous/graphitic material. The particulates were prepared in a similar manner as described in Example 2.

Example 5: Preparation of Nitrogenated Graphene Sheets

Graphene oxide (GO), synthesized in Example 12, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1/0.5, 1/1 and 1/2 are designated as N-1, N-2 and N-3 respectively and the nitrogen contents of these samples were 14.7, 18.2 and 17.5 wt. % respectively as determined by elemental analysis. These nitrogenated graphene sheets remain dispersible in water. These graphene sheets were used as a conducting material in the core or as a shell carbonaceous/graphitic material. The particulates were prepared in a similar manner as described in Example 1.

Example 6: Sulfonation of Triblock Copolymer Poly(Styrene-Isobutylene-Styrene) or SIBS An example of the sulfonation procedure used in this study is summarized as follows: a 10%0/(w/v) solution of SIBS (50 g) and a desired amount of graphene oxide sheets (0.15 TO 405 by wt.) in methylene chloride (500 ml) was prepared. The solution was stirred and refluxed at approximately 40 8 C, while a specified amount of acetyl sulfate in methylene chloride was slowly added to begin the sulfonation reaction. Acetyl sulfate in methylene chloride was prepared prior to this reaction by cooling 150 ml of methylene chloride in an ice bath for approximately 10 min. A specified amount of acetic anhydride and sulfuric acid was then added to the chilled methylene chloride under stirring conditions. Sulfuric acid was added approximately 10 min after the addition of acetic anhydride with acetic anhydride in excess of a 1:1 mole ratio. This solution was then allowed to return to room temperature before addition to the reaction vessel.

After approximately 5 h, the reaction was terminated by slowly adding 100 ml of methanol. The reacted polymer solution was then precipitated with deionized water. The precipitate was washed several times with water and methanol, separately, and then dried in a vacuum oven at 50 8 C for 24 h. This washing and drying procedure was repeated until the pH of the wash water was neutral. After this process, the final polymer yield was approximately 98% on average. This sulfonation procedure was repeated with different amounts of acetyl sulfate to produce several sulfonated polymers with various levels of sulfonation or ion-exchange capacities (IECs). The mol % sulfonation is defined as: mol %=(moles of sulfonic acid/moles of styrene)×100%, and the IEC is defined as the mille-equivalents of sulfonic acid per gram of polymer (mequiv./g).

After sulfonation and washing of each polymer, the S-SIBS samples were dissolved in a mixed solvent of toluene/hexanol (85/15, w/w) to form solutions having polymer concentrations ranging from 0.5 to 2.5% (w/v). Desired amounts of graphene sheets, CNTs, and expanded graphite (as examples of carbonaceous or graphitic materials) were added into these solutions and the resulting slurries were ultrasonicated for 0.5-1.5 hours.

In some samples, particles of a desired anode active material, along with a desired amount of a sacrificial material (e.g. baking soda), were added into the slurry samples. The slurry samples were separately spray-dried to form particulates containing a shell of sulfonated elastomer-bonded CNT or graphene embraced anode active material particles and pores. The pores were created by baking soda when heated.

Example 7: Synthesis of Sulfonated Polybutadiene (PB) by Free Radical Addition of Thiolacetic Acid (TAA) Followed by In Situ Oxidation with Performic Acid A representative procedure is given as follows. PB (8.0 g) was dissolved in toluene (800 mL) under vigorous stirring for 72 h at room temperature in a 1 L round-bottom flask. Benzophenone (BZP) (0.225 g; 1.23 mmol; BZP/olefin molar ratio=1:120) and TAA (11.9 mL; 0.163 mol, TAA/olefin molar ratio=1.1) were introduced into the reactor, and the polymer solution was irradiated for 1 h at room temperature with UV light of 365 nm and power of 100 W.

The resulting thioacetylated polybutadiene (PB-TA) was isolated by pouring 200 mL of the toluene solution in plenty of methanol and the polymer was recovered by filtration, washed with fresh methanol, and dried in vacuum at room temperature (Yield=3.54 g). Formic acid (117 mL; 3.06 mol; HCOOH/olefin molar ratio=25) was added to the toluene solution of PB-TA at 50° C. followed by slow addition of 52.6 mL of hydrogen peroxide (35 wt %; 0.61 mol; $H_2O_2$/olefin molar ratio=5) in 20 min. We would like to caution that the reaction is autocatalytic and strongly exothermic. The resulting rubber-solvent solution was used to deposit over (e.g. sprayed over) particulates of carbonaceous/graphitic material-encapsulated core of anode active material particles and the pores in the core region to bond particles of the carbonaceous or graphitic material (e.g. graphene sheets, expanded graphite flake, or carbon-bonded graphene sheets, etc.) together and to seal off any gaps or voids in the encapsulating shell.

Example 8: Cobalt Oxide ($Co_3O_4$) Anode Particulates

An appropriate amount of inorganic salts $Co(NO_3)_2.6H_2O$ and ammonia solution ($NH_3.H_2O$, 25 wt. %) were mixed together. The resulting suspension was stirred for several hours under an argon flow to ensure a complete reaction. The obtained $Co(OH)_2$ precursor suspension was calcined at 450° C. in air for 2 h to form particles of the layered $Co_3O_4$. Portion of the $Co_3O_4$ particles was then made into particulates each comprising a graphene/carbon shell-encapsulated core of carbon-coated $Co_3O_4$ particles and pores. The shell thickness was varied from 45 nm to 1.5 μm.

For electrochemical testing, the working electrodes were prepared by mixing 85 wt. % active material (elastomer composite encapsulated or non-encapsulated particulates of $Co_3O_4$, separately), 7 wt. % acetylene black (Super-P), and 8 wt. % polyvinylidene fluoride (PVDF) binder dissolved in N-methyl-2-pyrrolidinoe (NMP) to form a slurry of 5 wt. % total solid content. After coating the slurries on Cu foil, the electrodes were dried at 120° C. in vacuum for 2 h to remove the solvent before pressing. Then, the electrodes were cut into a disk (ϕ=12 mm) and dried at 100° C. for 24 h in vacuum. Electrochemical measurements were carried out using CR2032 (3V) coin-type cells with lithium metal as the counter/reference electrode, Celgard 2400 membrane as separator, and 1 M $LiPF_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using a CH-6 electrochemical workstation at a scanning rate of 1 mV/s.

The electrochemical performance of the particulates of carbon/graphene-encapsulated $Co_3O_4$ particles having pores created by-design and those having no pores were evaluated by galvanostatic charge/discharge cycling at a current density of 50 mA/g, using a LAND electrochemical workstation.

Figure 5:
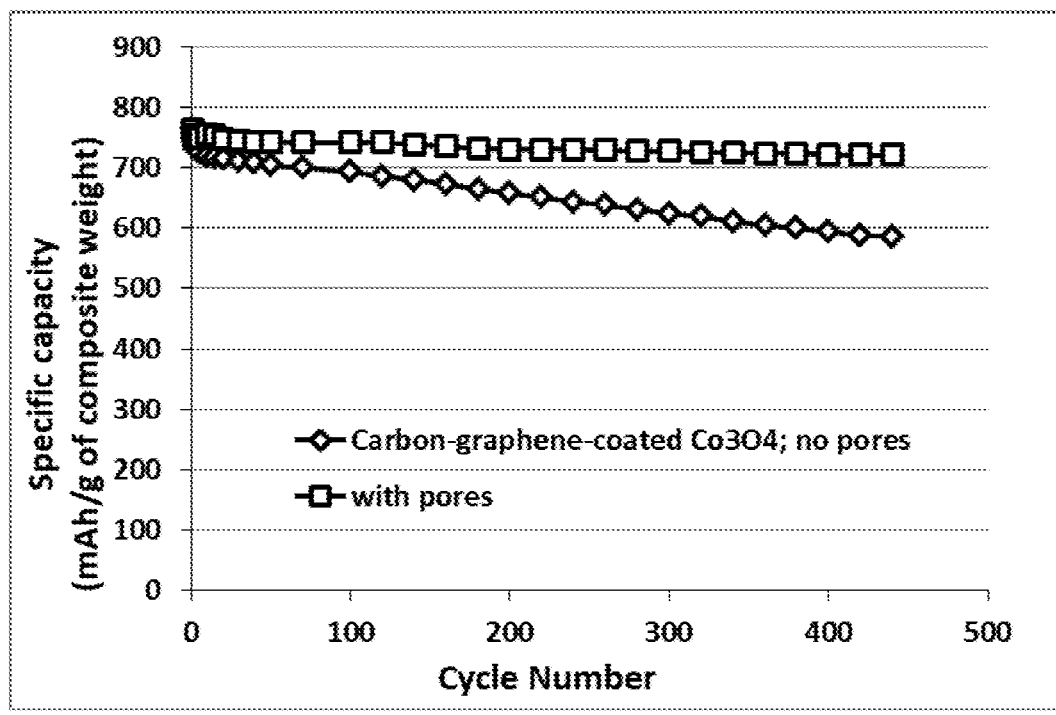
FIG. 5 The specific capacity of a lithium battery having an anode active material featuring particulates of carbon/graphene-encapsulated $Co_3O_4$ particles having pores in the core region and those having no pores.

As summarized in FIG. 5, the first-cycle lithium insertion capacity is 765 mAh/g, which is higher than the theoretical values of graphite (372 mAh/g). Both cells exhibit some first-cycle irreversibility. The initial capacity loss might have resulted from the incomplete conversion reaction and partially irreversible lithium loss due to the formation of solid electrolyte interface (SEI) layers.

As the number of charge/discharge cycles increases, the specific capacity of the pore-free $Co_3O_4$ particulate-based electrode drops at a much higher decay rate. Compared with its initial capacity value of approximately 765 mAh/g, its capacity suffers a 20% loss after 340 cycles (i.e. cycle life=340 cycles). By contrast, the presently invented carbon/graphene-encapsulated particulates having pores provide the battery cell with a very stable and high specific capacity for a large number of cycles, experiencing a capacity loss of less than 5.8% after 440 cycles. These data have clearly demonstrated the surprising and superior performance of the presently invented particulate electrode materials compared with prior art particulate-based electrode materials.

It may be noted that the number of charge-discharge cycles at which the specific capacity decays to 80% of its initial value is commonly defined as the useful cycle life of a lithium-ion battery. Thus, the cycle life of the cell containing the non-encapsulated anode active material is approximately 150 cycles. In contrast, the cycle life of the presently invented cells (not just button cells, but large-scale full cells) is typically from 1,000 to 4,000.

Example 9: Carbon/Graphene-Encapsulated Tin Oxide Particulates

Tin oxide ($SnO_2$) nanoparticles were obtained by the controlled hydrolysis of $SnCl_4.5H_2O$ with NaOH using the following procedure: $SnCl_4.5H_2O$ (0.95 g, 2.7 m-mol) and NaOH (0.212 g, 5.3 m-mol) were dissolved in 50 mL of distilled water each. The NaOH solution was added drop-wise under vigorous stirring to the tin chloride solution at a rate of 1 mL/min. This solution was homogenized by sonication for 5 minutes. Subsequently, the resulting hydrosol was reacted with $H_2SO_4$. To this mixed solution, few drops of 0.1 M of $H_2SO_4$ were added to flocculate the product. The precipitated solid was collected by centrifugation, washed with water and ethanol, and dried in vacuum. The dried product was heat-treated at 400° C. for 2 h under Ar atmosphere to obtain $SnO_2$ particles.

Figure 6:
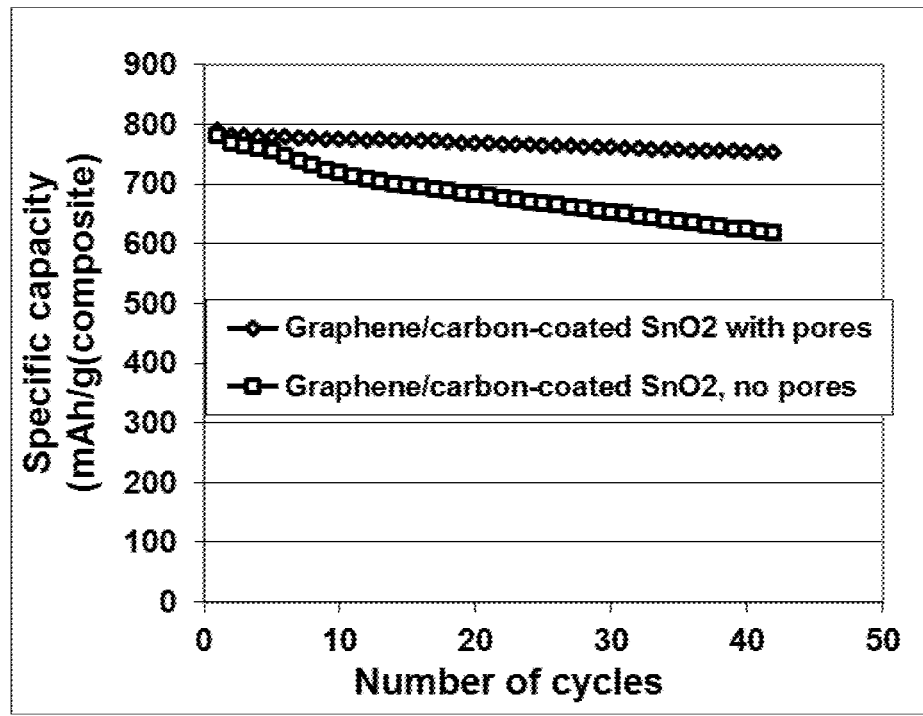
FIG. 6 The specific capacity of a lithium battery having an anode active material featuring carbon/graphene-encapsulated $SnO_2$ particles and pores and that having no pores.

The battery cells from the elastomer-encapsulated $SnO_2$ particles and non-coated $SnO_2$ particles were prepared using a procedure described in Example 1. FIG. 6 shows that the anode prepared according to the presently invented approach of encapsulated particulate having a high level of internal porosity offers a significantly more stable and higher reversible capacity compared to the $SnO_2$ particle-based particulates having no internal pores.

Example 10: Tin (Sn) Nanoparticles Encapsulated by a Carbon Shell

In one series of samples, nanoparticles (76 nm in diameter) of Sn and a sacrificial material (sub-micron SBR latex particles) were encapsulated with a thin layer of polyurethane (PU) shell via the spray-drying method, followed by curing of the PU chains. For comparison, another series of samples were prepared in a similar manner, but does not contain a sacrificial material. These samples were then subjected to heat treatments to convert PU shell into carbon and SBR into carbon and internal pores.

Figure 7:
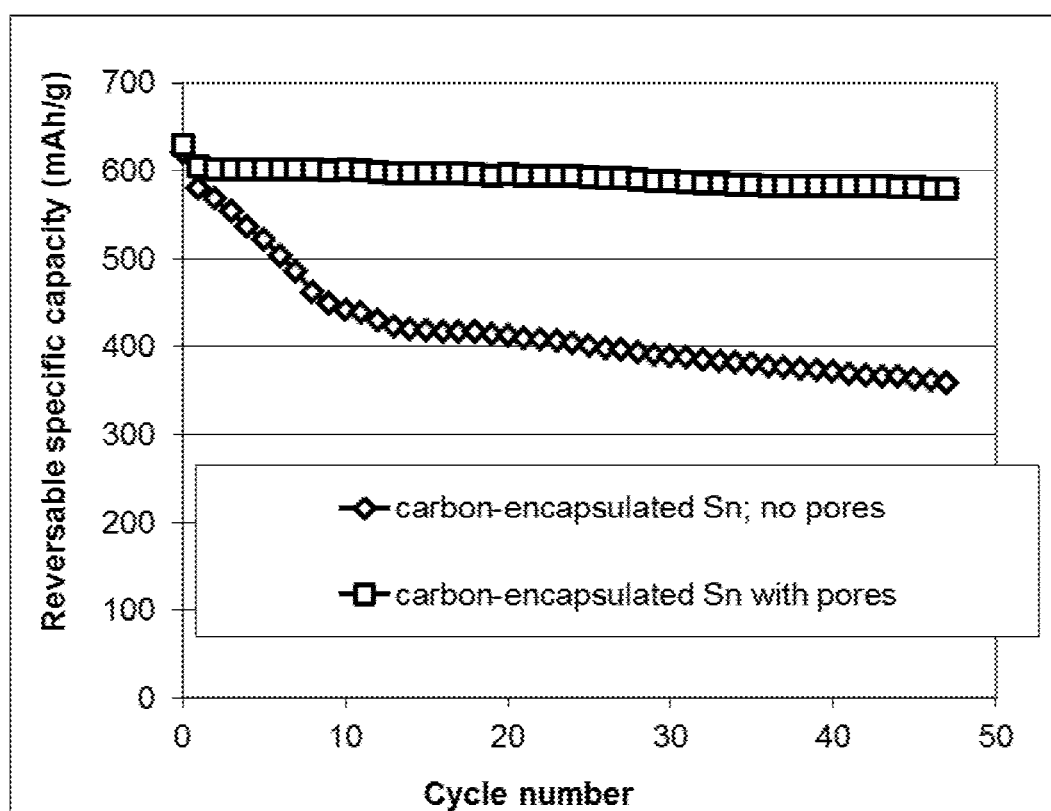
FIG. 7 The specific capacity of a lithium battery having an anode active material featuring carbon-encapsulated Sn particles having pores in the core and the same material but no porosity.

Shown in FIG. 7 are the discharge capacity curves of two lithium cells, one containing an anode electrode featuring carbon-encapsulated core containing Sn nanoparticles and internal pores and the other cell containing no pores. These results have clearly demonstrated that the presently invented encapsulation strategy provides an effective protection against fast capacity decay of a lithium-ion battery featuring a high-capacity anode active material. Carbon encapsulation alone without intentionally generated free space to accommodate expanded volume of the anode active material particles is not sufficient for the necessary protection.

Example 11: Si Nanowire-Based Particulates

Si nanowires were supplied from Angstron Energy Co. (Dayton, Ohio). In a first series of samples, Si nanowires (approximately 58% by weight based on the final particulate weight), oxidized expanded graphite flakes (5% by weight) and a sacrificial material (sub-micron SBR latex particles) were dispersed into water (containing 0.5% by weight of polyethylene oxide or PEO dissolved therein) to form a slurry. The slurry was then spray-dried to form particulates containing a core of Si nanowires, expanded graphite flakes, and SBR particles being embraced by an encapsulating shell of expanded graphite flake-PEO composite. Some of the particulates were then subjected to heat treatments that convert the polymer (SBR and PEO) into carbon and pores in the core region and carbon-bonded graphite flakes in the encapsulating shell. Surprisingly, the converted carbon along with the expanded graphite flakes in the encapsulating shell on the exterior surface of the particulate somehow form a relatively pore-free skin layer and yet, in contrast, the volume originally occupied by the SBR particles is turned into pores (20% to 78% by volume of pores, depending upon the proportion of SBR used) with some residual carbon that serves as an electron-conducting material for the Si nanowires. The Si nanowires occupy approximately 15% to 35% by volume in these samples.

A second series of samples were prepared in a similar manner, but did not contain SBR particles in the slurry. As such, the resulting particulates after heat treatments do not contain any significant amount of pores (typically <5%).

Figure 8:
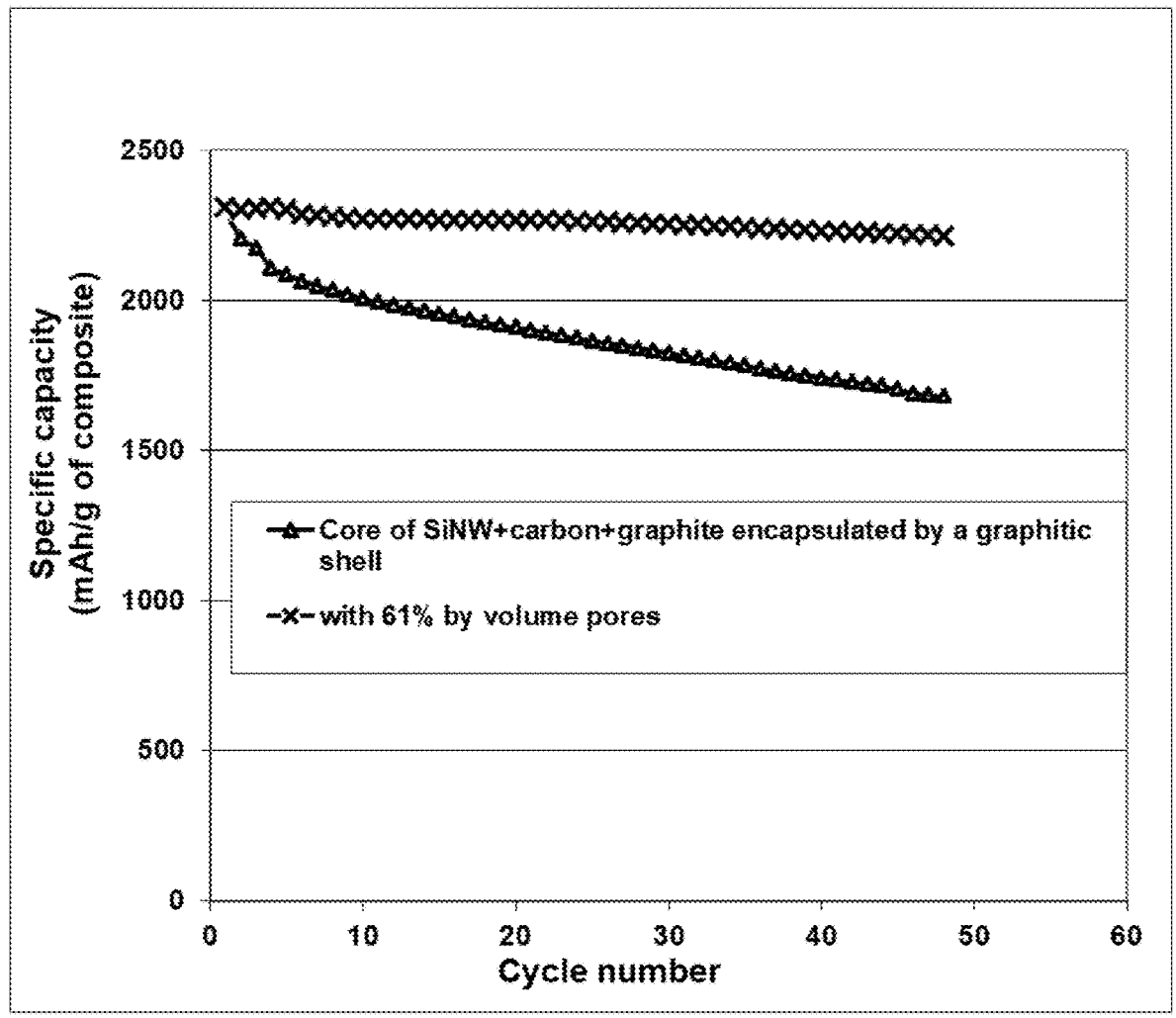
FIG. 8 Specific capacities of 2 lithium-ion cells having a core of Si nanowires (SiNW) and expanded graphite flakes dispersed in a carbon matrix derived from PEO/SBR and an encapsulating shell of expanded graphite flakes-carbon: one having pores derived from a carbonized sacrificial material and the other having no artificially created pores.

FIG. 8 shows the specific capacities of 2 lithium-ion cells having a core of Si nanowires (SiNW) and expanded graphite flakes dispersed in a carbon matrix derived from PEO/SBR and an encapsulating shell of expanded graphite flakes-carbon: one having pores (61% by volume) derived from a carbonized sacrificial material and the other having no artificially created pores. Clearly, the presently invented strategy of implementing artificially generated pores or free space in the anode particulates is very effective in reducing the rapid capacity decay issues commonly associated with high-capacity anode active materials.

Example 12: Inherently Porous Si Particle-Based Porous Particulates

Micron- and sub-micron-scale, inherently porous Si particles were prepared by acid etching of Al—Si alloy powder (FIG. 10A). The hydrochloric acid (HCl) etchant preferentially attacks Al, resulting in the formation of a foam-type porous Si particle structure (e.g. FIG. 10B). The following equation shows the etching reaction with Al and HCl:

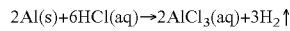

$2Al(s) + 6HCl(aq) \rightarrow 2AlCl_3(aq) + 3H_2 \uparrow$

Two samples were prepared by following the procedure described in Example 1 to obtain graphene-encapsulated single-particle particulates. One sample began with dispersing solid Si (non-porous) particles in the graphene-water suspension (containing no sacrificial material therein), followed by spray-drying. Most of the resulting particulates each contain one solid Si particle embraced by graphene sheets. The other sample began with dispersing porous Si particles in the graphene-water suspension (containing SBR particles as a sacrificial material also dispersed therein), followed by spray-drying. Most of the resulting particulates contain one single porous Si particle, but some also contain SBR particles. The sample was heat-treated at 350° C. for 1 hour and 750° C. for 1 hour to convert SBR into carbon and pores.

Figure 9:
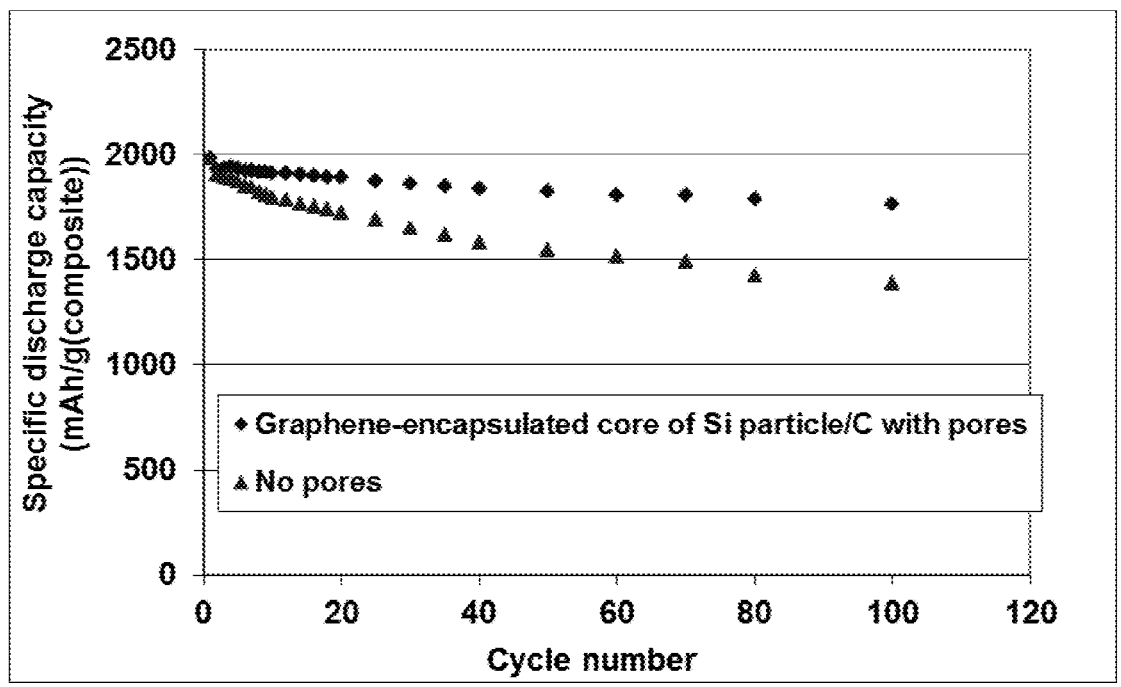
FIG. 9 Specific capacities of 2 lithium-ion cells: One cell has, in the anode, multiple particulates some of which each containing a core of single porous Si particles (550 nm-3 μm in diameter, obtained from etching of an Al—Si alloy) encapsulated by a shell of graphene.

Summarized in FIG. 9 are specific capacities of 2 lithium-ion cells. One cell has, in the anode, the particulates each containing a core of single porous Si particles (550 nm-3 m in diameter, obtained from etching of an Al—Si alloy) encapsulated by a shell of graphene. The anode electrode contains approximately 55% of such particulates, 37% of MCMB particles, and 8% binder (SBR rubber). The other cell has a similar anode, but having relatively pore-free Si particulates. The results have clearly demonstrated the surprising advantage of the presently invented porous particulates in imparting cycle stability to the lithium secondary batteries.

Example 13: Effect of Lithium Ion-Conducting Additive in a Carbon/Graphite-Enhanced Elastomer Shell A wide variety of lithium ion-conducting additives were added to several different sulfonated elastomer composites to prepare encapsulation shell materials for protecting core particles of an anode active material. We have discovered that these filled elastomer materials are suitable encapsulation shell materials provided that their lithium ion conductivity at room temperature is no less than $10^{-7}$ S/cm. With these materials, lithium ions appear to be capable of readily diffusing in and out of the encapsulation shell having a thickness no greater than 1 μm. For thicker shells (e.g. 10 μm), a lithium ion conductivity at room temperature no less than $10^{-4}$ S/cm would be required.

TABLE 2

Lithium ion conductivity of various sulfonated elastomer composite compositions as a shell material for protecting anode active material particles.

| Sample | Lithium-conducting additive | 3% graphene-elastomer (1-2.5 μm thick); unless otherwise noted | Li-ion conductivity (S/cm) |
| --- | --- | --- | --- |
| E-1s | $Li_2CO_3$ + $(CH_2OCO_2Li)_2$ | 70-99% polyurethane, 2% RGO | $5.0 \times 10^{-6}$ to $4.6 \times 10^{-3}$ S/cm |
| E-2s | $Li_2CO_3$ + $(CH_2OCO_2Li)_2$ | 65-99% polyisoprene, 8% pristine graphene | $168 \times 10^{-5}$ to $7.2 \times 10^{-4}$ S/cm |
| E-3s | $Li_2CO_3$ + $(CH_2OCO_2Li)_2$ | 65-80% SBR, 15% RGO | $8.6 \times 10^{-6}$ to $8.73 \times 10^{-4}$ S/cm |
| D-4s | $Li_2CO_3$ + $(CH_2OCO_2Li)_2$ | 70-99% urethane-urea, 12% nitrogenated graphene | $1.4 \times 10^{-6}$ to $6.2 \times 10^{-4}$ S/cm |
| D-5s | $Li_2CO_3$ + $(CH_2OCO_2Li)_2$ | 75-99% polybutadiene | $2.0 \times 10^{-5}$ to $7.7 \times 10^{-3}$ S/cm |
| B1s | LiF + LiOH + $Li_2C_2O_4$ | 80-99% chloroprene rubber | $1.5 \times 10^{-6}$ to $6.5 \times 10^{-4}$ S/cm |
| B2s | LiF + HCOLi | 80-99% EPDM | $5.4 \times 10^{-6}$ to $4.2 \times 10^{-3}$ S/cm |
| B3s | LiOH | 70-99% polyurethane | $3.7 \times 10^{-5}$ to $4.2 \times 10^{-3}$ S/cm |
| B4s | $Li_2CO_3$ | 70-99% polyurethane | $5.2 \times 10^{-5}$ to $5.0 \times 10^{-3}$ S/cm |
| B5s | $Li_2C_2O_4$ | 70-99% polyurethane | $2.2 \times 10^{-5}$ to $3.0 \times 10^{-3}$ S/cm |
| B6s | $Li_2CO_3$ + LiOH | 70-99% polyurethane | $2.5 \times 10^{-5}$ to $4.0 \times 10^{-3}$ S/cm |
| C1s | $LiClO_4$ | 70-99% urethane-urea | $5.5 \times 10^{-5}$ to $4.4 \times 10^{-3}$ S/cm |

TABLE 2-continued

Lithium ion conductivity of various sulfonated elastomer composite compositions as a shell material for protecting anode active material particles.

| Sample | Lithium-conducting additive | 3% graphene-elastomer (1-2.5 μm thick); unless otherwise noted | Li-ion conductivity (S/cm) |
|---|---|---|---|
| C2s | $LiPF_6$ | 70-99% urethane-urea | $4.5 \times 10^{-5}$ to $1.5 \times 10^{-3}$ S/cm |
| C3s | $LiBF_4$ | 70-99% urethane-urea | $3.0 \times 10^{-5}$ to $4.1 \times 10^{-4}$ S/cm |
| C4s | $LiBOB + LiNO_3$ | 70-99% urethane-urea | $8.5 \times 10^{-6}$ to $3.1 \times 10^{-4}$ S/cm |
| S1s | Sulfonated polyaniline | 85-99% SBR | $8.1 \times 10^{-6}$ to $9.0 \times 10^{-4}$ S/cm |
| S2s | Sulfonated SBR | 85-99% SBR | $7.4 \times 10^{-6}$ to $5.5 \times 10^{-4}$ S/cm |
| S3s | Sulfonated PVDF | 80-99% chlorosulfonated polyethylene (CS-PE) | $5.2 \times 10^{-6}$ to $5.4 \times 10^{-4}$ S/cm |
| S4s | Polyethylene oxide | 80-99% CS-PE | $6.4 \times 10^{-6}$ to $4.4 \times 10^{-4}$ S/cm |

Example 14: Cycle Stability of Various Rechargeable Lithium Battery Cells

In lithium-ion battery industry, it is a common practice to define the cycle life of a battery as the number of charge-discharge cycles that the battery suffers 20% decay in capacity based on the initial capacity measured after the required electrochemical formation. Summarized in Table 3 below are the cycle life data of a broad array of batteries featuring presently invented elastomer-encapsulated anode active material particles vs. other types of anode active materials.

These data further confirm the following:
(1) The carbon/graphitic material encapsulation strategy, featuring a high-level of porosity in the core of a particulate, is surprisingly effective in alleviating the anode expansion/shrinkage-induced capacity decay problems.
(2) The encapsulation of high-capacity anode active material particles by carbon or other non-elastomeric protective materials, without internal pores in the core, does not provide much benefit in terms of improving cycling stability of a lithium-ion battery.
(3) Prelithiation of the anode active material particles prior to encapsulation is beneficial.

TABLE 3

Cycle life data of various lithium secondary (rechargeable) batteries.

| Sample ID | Protective means; 1-5% graphene and/or 5-25% C; bonded by elastomer | Type & % of anode active material | Initial capacity (mAh/g) | Cycle life (No. of cycles) |
|---|---|---|---|---|
| Si-1i | SBR-bonded graphene sheets; with 66% pores in the core | 28% by wt. Si nanoparticles (80 nm) + 64% graphite + 8% binder | 1,243 | 1,555-1,756 |
| Si-2i | SBR-bonded graphene sheets, no pores | 28% by wt. Si nanoparticles (80 nm) + 64% graphite + 8% binder | 1,246 | 244 |
| SiNW-1i | Urea-Urethane-bonded expanded graphite flakes, pores | 38% C-coated Si nanowires (diameter = 90 nm) | 1,376 | 1,577 |
| SiNW-2i | Urea-Urethane-bonded expanded graphite flakes, no pores | 38% C-coated Si nanowires (diameter = 90 nm) | 1,766 | 1,920 (prelithiated); 1,634 (no prelithiation) |
| $Co_3O_4$-2i | Polyisoprene-bonded CNT; pores | 85% $Co_3O_4$ + 8% graphite platelets + binder | 720 | 2,455 (prelithiated); 1,705 (no pre-Li) |
| $Co_3O_4$-2i | Polyisoprene-bonded CNT; no pores | 85% $Co_3O_4$ + 8% graphite platelets + binder | 725 | 260 |
| Ge-1i | Graphene/carbon encapsulation; pores | 85% Ge + 8% graphite platelets + binder | 852 | 1,676 |
| Ge-2i | Graphene/carbon encapsulation; pores | 85% Ge + 8% graphite platelets + binder | 856 | 125 |
| Al-Li-1i | Carbon-bonded expanded graphite; pores | Al/Li alloy (3/97) particles | 2,848 | 1,788 |
| Al-Li-2i | Carbon-bonded expanded graphite; no pores | Al/Li alloy particles | 2,847 | 145 |
| Zn-Li-1i | Cis-polyisoprene bonded fluorinated graphene; pores | C-coated Zn/Li alloy (5/95) particles | 2,618 | 1,560 |
| Zn-Li-2i | Cis-polyisoprene bonded fluorinated graphene; no pores | C-coated Zn/Li alloy (5/95) particles | 2,616 | 148 |

I claim:

1. A method of producing a powder mass of multiple particulates for an anode of a lithium battery, the method comprising:
   A) dispersing an electrically conducting material, primary particles of an anode active material, an optional electron-conducting material, and a sacrificial material in a liquid medium to form a precursor mixture or a multi-component suspension or slurry;
   B) forming the precursor mixture into droplets and drying the droplets into multiple particulates wherein at least one of the particulates comprises particles of a carbonaceous or graphitic material comprising graphene sheets or expanded graphite flakes, at least one primary particle of the anode active material, the optional electron-conducting material, and the sacrificial material; and
   C) removing the sacrificial material or thermally converting the sacrificial material into a carbon material that is bonded to at least one of the primary particle of the anode active material to obtain multiple particulates; wherein wherein at least one of the particulates comprises a core and a thin encapsulating layer that encapsulates said core, wherein said core comprises a single or a plurality of said primary particles of anode active material having a volume Va, said electron-conducting material occupying from 0% to 50% by weight of said particulate weight, and pores having a volume Vp, and said thin encapsulating layer comprises an electrically conducting material and has a thickness from 1 nm to 10 μm, an electric conductivity from $10^{-6}$ S/cm to 20,000 S/cm and a lithium ion conductivity from $10^{-8}$ S/cm to $5\times10^{-2}$ S/cm and wherein the volume ratio Vp/Va is from 0.3/1.0 to 5.0/1.0 and, if a single primary particle is encapsulated, the single primary particle is itself porous having a free space to expand into without straining said thin encapsulating layer when said lithium battery is charged.

2. The method of claim 1, further comprising a step of incorporating said powder mass to form an anode and combining said anode, an electrolyte, and a cathode to form a lithium battery.

3. The method of claim 1, wherein said electrically conducting material in said thin encapsulating layer comprises a carbonaceous or graphitic material.

4. The method of claim 1, wherein said electron-conducting material in said core or said electrically conducting material in said encapsulating layer is selected from a carbon nanotube, carbon nanofiber, nano carbon particle, metal nanoparticle, metal nanowire, electron-conducting polymer, graphene, or a combination thereof, wherein said graphene is selected from pristine graphene, graphene oxide, reduced graphene oxide, graphene fluoride, graphene chloride, nitrogenated graphene, hydrogenated graphene, doped graphene, functionalized graphene, or a combination thereof and said graphene comprise single-layer graphene or few-layer graphene, wherein said few-layer graphene is defined as a graphene platelet formed of less than 10 graphene planes.

5. The method of claim 4, wherein said electron-conducting polymer is selected from polyaniline, polypyrrole, polythiophene, polyfuran, a bi-cyclic polymer, a sulfonated derivative thereof, or a combination thereof.

6. The method of claim 1, wherein said electron-conducting material in said core or said electrically conducting material in said encapsulating layer comprises a material selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, graphene or a combination thereof.

7. The method of claim 1, wherein said thin encapsulating layer comprises a carbonaceous or graphitic material dispersed in or bonded by a polymer.

8. The method of claim 7, wherein said polymer contains an adhesive resin, a thermoplastic resin, an elastomer or rubber, a copolymer thereof, an interpenetrating network thereof, or a blend thereof.

9. The method of claim 1, wherein said anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; and (h) combinations thereof.

10. The method of claim 9, wherein said Li alloy contains from 0.1% to 10% by weight of a metal element selected from Zn, Ag, Au, Mg, Ni, Ti, Fe, Co, V, or a combination.

11. The method of claim 1, wherein at least one of said anode active material particles is coated with a layer of carbon or graphene prior to being encapsulated.

12. The method of claim 1, wherein at least one of said particulates further comprises from 0.1% to 40% by weight of a lithium ion-conducting additive dispersed in said thin encapsulating layer or in ionic contact with said anode active material particles encapsulated therein.

13. The method of claim 12, wherein said lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$ and $1\leq y\leq4$.

14. The method of claim 12, wherein said lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium (LiN($CF_3SO_2$)), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

15. The method of claim 12, wherein said lithium ion-conducting additive contains a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a sulfonated derivative thereof, or a combination thereof.

16. The method of claim 1, wherein said step of forming the precursor mixture into droplets and drying the droplets into multiple particulates includes operating a procedure selected from pan-coating, air-suspension coating, centrifugal extrusion, vibration-nozzle encapsulation, spray-drying, coacervation-phase separation, interfacial polycondensation and interfacial cross-linking, in-situ polymerization, matrix polymerization, or a combination thereof.

17. The method of claim 2, further comprising a procedure of operating said lithium battery in such a manner that said anode is at an electrochemical potential below 1.5 V vs. Li/Li$^+$ during at least one of the first 10 charge/discharge cycles of said battery.

18. The method of claim 2, further comprising a procedure of operating said lithium battery in such a manner that surfaces of said particulates become electrically non-conducting after the first 1-10 charge/discharge cycles.

* * * * *